(12) United States Patent
Shi et al.

(10) Patent No.: US 12,022,012 B1
(45) Date of Patent: Jun. 25, 2024

(54) SYSTEMS AND METHODS FOR VEHICLE ENCRYPTED COMMUNICATION FOR VEHICLE-ROAD-CLOUD COLLABORATION

(71) Applicant: HEFEI UNIVERSITY OF TECHNOLOGY, Anhui (CN)

(72) Inventors: Qin Shi, Hefei (CN); Junjie Zhu, Hefei (CN); Teng Cheng, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/534,683

(22) Filed: Dec. 10, 2023

Related U.S. Application Data

(63) Continuation-in-part of application No. PCT/CN2023/112230, filed on Aug. 10, 2023.

(30) Foreign Application Priority Data

Jan. 16, 2023 (CN) .......................... 202310060219.X

(51) Int. Cl.
  *H04L 9/32* (2006.01)
  *H04L 9/08* (2006.01)

(52) U.S. Cl.
  CPC .......... *H04L 9/3268* (2013.01); *H04L 9/0852* (2013.01); *H04L 9/0869* (2013.01)

(58) Field of Classification Search
  None
  See application file for complete search history.

(56) References Cited

U.S. PATENT DOCUMENTS

| | | | |
|---|---|---|---|
| 10,855,452 B2 * | 12/2020 | Fu | H04L 9/0825 |
| 2020/0403787 A1 | 12/2020 | Islam et al. | |
| 2021/0126801 A1 * | 4/2021 | Nix | H04L 9/0861 |

FOREIGN PATENT DOCUMENTS

| | | |
|---|---|---|
| CN | 106357649 A | 1/2017 |
| CN | 107612899 A | 1/2018 |

(Continued)

OTHER PUBLICATIONS

First Office Action in Chinese Application No. 202310060219.X mailed on Mar. 16, 2023, 15 pages.

(Continued)

*Primary Examiner* — Bassam A Noaman
(74) *Attorney, Agent, or Firm* — Porus IP LLC

(57) ABSTRACT

System for vehicle encrypted communication for vehicle-road-cloud collaboration is provided. The system includes a vehicle-side communication unit disposed on a vehicle and a second quantum random number generator disposed on a visitor. The vehicle-side communication unit includes a first quantum random number generator, a quantum key management module, an on-vehicle communication module, a user authorization module, a certificate management module, and a quantum encryption and decryption module. The visitor generates an access request and sends the access request to the vehicle, after the on-vehicle communication module receives the access request, the user checks the access request and decides whether to authorize the access request through the user authorization module, and in response to the access request of the visitor B being authorized, the certificate management module generates a digital certificate corresponding to the access request, and the on-vehicle communication module sends the digital certificate to the visitor.

6 Claims, 6 Drawing Sheets

(56) References Cited

FOREIGN PATENT DOCUMENTS

| | | | |
|---|---|---|---|
| CN | 109756500 A | | 5/2019 |
| CN | 110830245 A | | 2/2020 |
| CN | 110881177 A | | 3/2020 |
| CN | 114221762 A | | 3/2022 |
| CN | 114338003 A | | 4/2022 |
| CN | 114419928 A | | 4/2022 |
| CN | 114707160 A | | 7/2022 |
| CN | 115001722 A | * | 9/2022 |
| CN | 115001722 A | | 9/2022 |
| CN | 115190154 A | | 10/2022 |
| WO | 2022245817 A1 | | 11/2022 |

OTHER PUBLICATIONS

Decision to Grant a Patent in Chinese Application No. 202310060219.X mailed on Mar. 28, 2023, 5 pages.

Chen, Shi et al., Design and Simulation of Quantum Circuits of B92 QKD Protocol, Chinese Journal of Quantum Electronics, 33(1): 51-55, 2016.

Cheng, Teng et al., Secure Interactive Architecture of Cloud Driving System Based on 5G and Quantum Encryption, IEEE, 2021, 6 pages.

* cited by examiner

200

210
Generating, by a vehicle A, a digital certificate and sending the digital certificate to a visitor B

220
Establishing a communication connection between the visitor B and the on-vehicle communication module 130 through the digital certificate, a first quantum random number, and a second quantum random number

310
Generating, by the visitor B, the access request, a visitor public key Pb and a visitor private key Sb corresponding to the visitor B and sending, by the visitor B, the access request together with the visitor public key Pb to the vehicle A

320
Checking, by a user of the vehicle A, the access request and deciding whether to authorize the access request of the visitor B through the user authorization module after the vehicle communication module of the vehicle A receives the access request and the visitor public key Pb

330
Generating, by the certificate management module, a digital certificate, a vehicle public key Pa and a vehicle private key Sa corresponding to the vehicle A after the user authorizes the access request of the visitor B and determines the access time of the visitor B

340
Generating, by the vehicle communication module, a certificate digest of the digital certificate based on a digest algorithm, generating a first signature value x1 of the digital certificate by performing signing on the certificate digest based on the vehicle private key Sa and a signature encryption algorithm in the digital certificate, obtaining an encrypted digital certificate by encrypting the digital certificate accompanied with the first signature value x1 and the vehicle public key Pa based on the visitor public key Pb, sending, by the on-vehicle communication module, the encrypted digital certificate to the visitor B and storing, by the certificate management module, the digital certificate at the same time

350
Obtaining, by the visitor B, the digital certificate, the accompanying first signature value x1, and the vehicle public key Pa by decrypting the encrypted digital certificate based on the visitor private key Sa after receiving the encrypted digital certificate, generating, by the visitor B, a certificate digest of the digital certificate based on the digest algorithm, generating, by the visitor B, a second signature value x2 of the digital certificate by performing signing on the certificate digest based on the vehicle public key Pa and the signature encryption algorithm in the digital certificate, and comparing, by the visitor B, the generated second signature value x2 with the accompanying first signature value x1, in response to the generated second signature value x2 being consistent with the accompanying first signature value x1 and the digital certificate being authentic, storing, by the visitor B, the digital certificate locally; or in response to the generated second signature value x2 being inconsistent with the accompanying first signature value x1 and the digital certificate being fake, discarding, by the visitor B, the digital certificate

FIG. 3

SYSTEMS AND METHODS FOR VEHICLE ENCRYPTED COMMUNICATION FOR VEHICLE-ROAD-CLOUD COLLABORATION

CROSS-REFERENCE TO RELATED APPLICATIONS

This application is a Continuation-in-part of International Application No. PCT/CN2023/112230, filed on Aug. 10, 2023, which claims priority to Chinese Application No. 202310060219.X, filed on Jan. 16, 2023, the entire contents of each which are hereby incorporated by reference.

TECHNICAL FIELD

The present disclosure relates to the technical field of the Internet of Vehicles (IoV), and in particular, relates to systems and methods for vehicle encrypted communication for vehicle-road-cloud collaboration.

BACKGROUND

In a vehicle-road-cloud collaboration system, a wireless communication technology, an Internet of Things (IoT) technology, a fusion perception technology, a vehicle control technology, etc. are used. The entire vehicle-road-cloud collaboration system transmits vehicle information and road environment information collected by intelligent sensors on the vehicle to a road-side device by connecting a vehicle equipped with a communication device with the road-side device. The road-side device summarizes all the vehicle information and the information collected by its own sensors for analysis and calculation and sends the analyzed control information to the vehicle. The road-side device not only has an ability to analyze and calculate, but also needs a cloud-side server to coordinate all the road-side devices and vehicles in a relatively large region, so as to achieve convenient and efficient traffic management and reduce the possibility of traffic accidents.

Since the current vehicle-road-cloud collaboration communication lacks sufficient confidentiality, the communication content (e.g., vehicle information sent by the vehicle to a visitor or a communication request sent by the visitor to the vehicle) between the vehicle and a visitor (other vehicles, road sides, or cloud sides) may be easily intercepted and cracked. A hacker may forge the communication request according to the decrypted content and send the forged communication request to the vehicle, which poses a serious threat to the information security of the vehicle-road-cloud collaboration system.

In view of the current common quantum encryption technology, a quantum key is generated using a quantum principle, a quantum key distribution mainly uses photons as carriers of quantum states, physical characteristics of light quantum determine the absolute security in the quantum key distribution process, and the specific principles are as follows. (1) Principle of non-clonability. The linear characteristic of quantum mechanics determines that a quantum bit may not be replicated exactly without interfering with its initial state. An eavesdropper may not hide eavesdropping behavior by copying that quantum bit, which greatly ensures security during quantum encrypted communication. (2) Heisenberg Uncertainty Principle. The act of measuring itself may inevitably interfere with the measured target, which in turn changes its physical state. In quantum mechanics, to measure a position of a light quantum, it is inevitable to interfere with its momentum. In the same way, to measure a speed of a light quantum, it is impossible to measure its position precisely. Once a third party takes any eavesdropping behavior in the quantum transmission process, its quantum bit value may be inevitably changed, thereby exposing its eavesdropping behavior.

However, traditional quantum encryption requires a fiber channel for quantum key transmission, which means that the two communicating parties have to use optical fiber for a wired connection, and it is obvious that this traditional quantum encryption is not suitable for the vehicle that has to keep moving.

In addition, with the improvement of the intelligence level of the vehicle, sensors such as a camera, a radar, or a laser radar are densely distributed in various positions of the vehicle. Vehicle data includes a large amount of personal information, the ownership of the vehicle data is controversial. In the existing Internet of Vehicles technology application, the vehicle data is stored in a server of a car manufacturer, a vehicle owner may not access it without the cooperation of the car manufacturer, and the vehicle owner lacks technical support if the vehicle owner wants to obtain the right to control the vehicle data.

SUMMARY

In order to overcome the shortcomings in the above prior art, embodiments of the present disclosure provide a system for vehicle encrypted communication for vehicle-road-cloud collaboration for protecting vehicle data and protecting communication security when a vehicle communicates with a visitor.

In order to achieve the above purposes, one or more embodiments of the present disclosure provide the system for vehicle encrypted communication for vehicle-road-cloud collaboration. The system includes a vehicle-side communication unit disposed on a vehicle A and a second quantum random number generator disposed on a visitor B. The visitor B is a communication device in a vehicle-road-cloud collaboration system, including other vehicles, cloud sides, and road sides. The second quantum random number generator is configured to generate a second quantum random number.

The vehicle-side communication unit includes: a first quantum random number generator, a quantum key management module, an on-vehicle communication module, a user authorization module, a certificate management module, and a quantum encryption and decryption module.

The first quantum random number generator is configured to generate a first quantum random number.

The quantum key management module is connected to the first quantum random number generator through a fiber channel and is configured to obtain the first quantum random number as a quantum key, and the quantum key management module is configured to update and manage the quantum key.

The on-vehicle communication module is configured to receive an access request from the visitor B and send a digital certificate to the visitor B.

A user of the vehicle A decides whether to authorize the access request of the visitor B through the user authorization module.

The certificate management module is configured to generate the digital certificate corresponding to the access request based on the access request of the visitor B, and to store and manage the digital certificate, and the digital certificate is configured to establish a communication connection between the visitor B and the on-vehicle communication module.

The quantum encryption and decryption module is configured to encrypt and decrypt a communication content based on the quantum key in the digital certificate.

The visitor B generates the access request and sends the access request to the vehicle A, after the on-vehicle communication module receives the access request from the visitor B, the user checks the access request and decides whether to authorize the access request through the user authorization module, and in response to the access request of the visitor B being authorized, the certificate management module generates the digital certificate corresponding to the access request, and the on-vehicle communication module sends the digital certificate to the visitor B. The communication connection is established between the visitor B and the on-vehicle communication module through the digital certificate, the first quantum random number, and the second quantum random number.

The digital certificate includes a certificate serial number, certificate validity, a certificate validity time, visitor information, quantum key information, and a signature algorithm.

The certificate serial number is a unique identification number of the digital certificate.

The certificate validity time is generated based on an access time of the visitor B determined by the user. The certificate validity is determined based on the certificate validity time, wherein the certificate validity is valid when the access time is within the certificate validity time, and the certificate validity is invalid when the access time is outside the validity time.

The visitor information is device information of the visitor B.

The quantum key information includes the quantum key, a quantum encryption and decryption algorithm, and a quantum key expiration time.

The signature algorithm includes a digest algorithm and a signature encryption algorithm, the digest algorithm being configured to generate a digest, and the signature encryption algorithm being configured to perform signing to generate a signature value.

The communication connection being established between the visitor B and the on-vehicle communication module of the vehicle A through the digital certificate, the first quantum random number and the second quantum random number includes:

step 410, converting, by the visitor B, a communication request content into a request message according to a message format of a communication protocol based on the certificate serial number and the quantum key information of the digital certificate held by the visitor B, and the second quantum random number generated in real time by the second quantum random number generator and sending the request message to the vehicle A;

step 420, obtaining, by the on-vehicle communication module of the vehicle A, the communication request content by parsing the request message according to the message format of the communication protocol after receiving the request message sent by the visitor B;

step 430, generating, by the vehicle A, a vehicle reply content by obtaining vehicle data based on the communication request content, converting the vehicle reply content into a reply message according to the message format of the communication protocol based on the certificate serial number and the quantum key information in a corresponding digital certificate managed by the certificate management module and the first quantum random number generated in real time by the first quantum random number generator, and sending the reply message to the visitor B; and step 440, obtaining, by the visitor B, the vehicle reply content by parsing the reply message according to the message format of the communication protocol after receiving the reply message sent by the vehicle A.

In step 410 and step 430, a structure of the request message or the reply message includes in turn: a start identifier, a message header, a message body, and an end identifier.

A content in the message header includes in turn: a message type, a message length, the certificate serial number, a timestamp, and a message serial number, wherein the message type includes a type of the request message sent by the visitor B to the vehicle A and a type of the reply message sent by the vehicle A to the visitor B; and the timestamp is the timestamp at which the request message or the reply message is generated.

A content in the message body includes in turn: an encrypted communication request content or an encrypted vehicle reply content, a message digest, the second quantum random number or the first quantum random number, and a random number signature value, wherein the encrypted communication request content or the encrypted vehicle reply content is obtained by encrypting the communication request content or the vehicle reply content based on the quantum encryption and decryption algorithm and the quantum key in the quantum key information; the message digest is obtained by performing the digest algorithm processing on all contents from the message header to the message digest; the second quantum random number or the first quantum random number is generated in real time by the second quantum random number generator or the first quantum random number generator; and the random number signature value is generated by the visitor B performing signing on the second quantum random number based on a visitor private key Sb and the signature encryption algorithm, or is generated by the vehicle A performing signing on the first quantum random number based on a vehicle private key Sa and the signature encryption algorithm.

One or more embodiments of the present disclosure further provide a method for vehicle encrypted communication for vehicle-road-cloud collaboration applied to the system for vehicle encrypted communication for vehicle-road-cloud collaboration described in any one of the embodiments of the present disclosure. The certificate management module is configured to generate a digital certificate corresponding to an access request and the on-vehicle communication module is configured to send the digital certificate to the visitor B, including:

step 310, generating, by the visitor B, the access request, a visitor public key Pb and the visitor private key Sb corresponding to the visitor B and sending, by the visitor B, the access request together with the visitor public key Pb to the vehicle A;

step 320, checking, by a user of the vehicle A, the access request and deciding whether to authorize the access request of the visitor B through the user authorization module (140) after the on-vehicle communication module (130) of the vehicle A receives the access request and the visitor public key Pb;

step 330, generating, by the certificate management module (150), the digital certificate, a vehicle public key Pa and the vehicle private key Sa corresponding to the vehicle A after the user authorizes the access request of the visitor B and determines an access time of the visitor B;

step 340, generating, by the on-vehicle communication module (130), a certificate digest of the digital certificate based on the digest algorithm, generating a first signature value x1 of the digital certificate by performing signing on the certificate digest based on the vehicle private key Sa and the signature encryption algorithm in the digital certificate, obtaining an encrypted digital certificate by encrypting the digital certificate accompanied with the first signature value x1 and the vehicle public key Pa based on the visitor public key Pb, and sending, by the on-vehicle communication module (130), the encrypted digital certificate to the visitor B; storing, by the certificate management module (150), the digital certificate at the same time; and step 350, obtaining, by the visitor B, the digital certificate, the accompanying first signature value x1, and the vehicle public key Pa by decrypting the encrypted digital certificate based on the visitor private key Sa after receiving the encrypted digital certificate, generating a certificate digest of the digital certificate based on the digest algorithm, generating, by the visitor B, a second signature value x2 of the digital certificate by performing signing on the certificate digest based on the vehicle public key Pa and the signature encryption algorithm in the digital certificate, and comparing, by the visitor B, the generated second signature value x2 with the accompanying first signature value x1, in response to the generated second signature value x2 being consistent with the accompanying first signature value x1 and the digital certificate being authentic, storing, by the visitor B, the digital certificate locally; or in response to the generated second signature value x2 being inconsistent with the accompanying first signature value x1 and the digital certificate being fake, discarding, by the visitor B, the digital certificate.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, where like reference numerals represent similar structures throughout the several views of the drawings, wherein:

FIG. 2 is an exemplary flowchart of a process of a method for vehicle encrypted communication for vehicle-road-cloud collaboration according to some embodiments of the present disclosure;

FIG. 3 is an exemplary flowchart of a process for generating, by a vehicle A, a digital certificate and sending the digital certificate to a visitor B according to some embodiments of the present disclosure;

DETAILED DESCRIPTIONS

In order to more clearly illustrate the technical solutions related to the embodiments of the present disclosure, a brief introduction of the drawings referred to the description of the embodiments is provided below.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing.

When describing the operations performed in the embodiments of the present disclosure according to the steps, the order of the steps is interchangeable, the steps may be omitted, and other steps may be included in the process of the operation unless otherwise specified.

Figure 1:
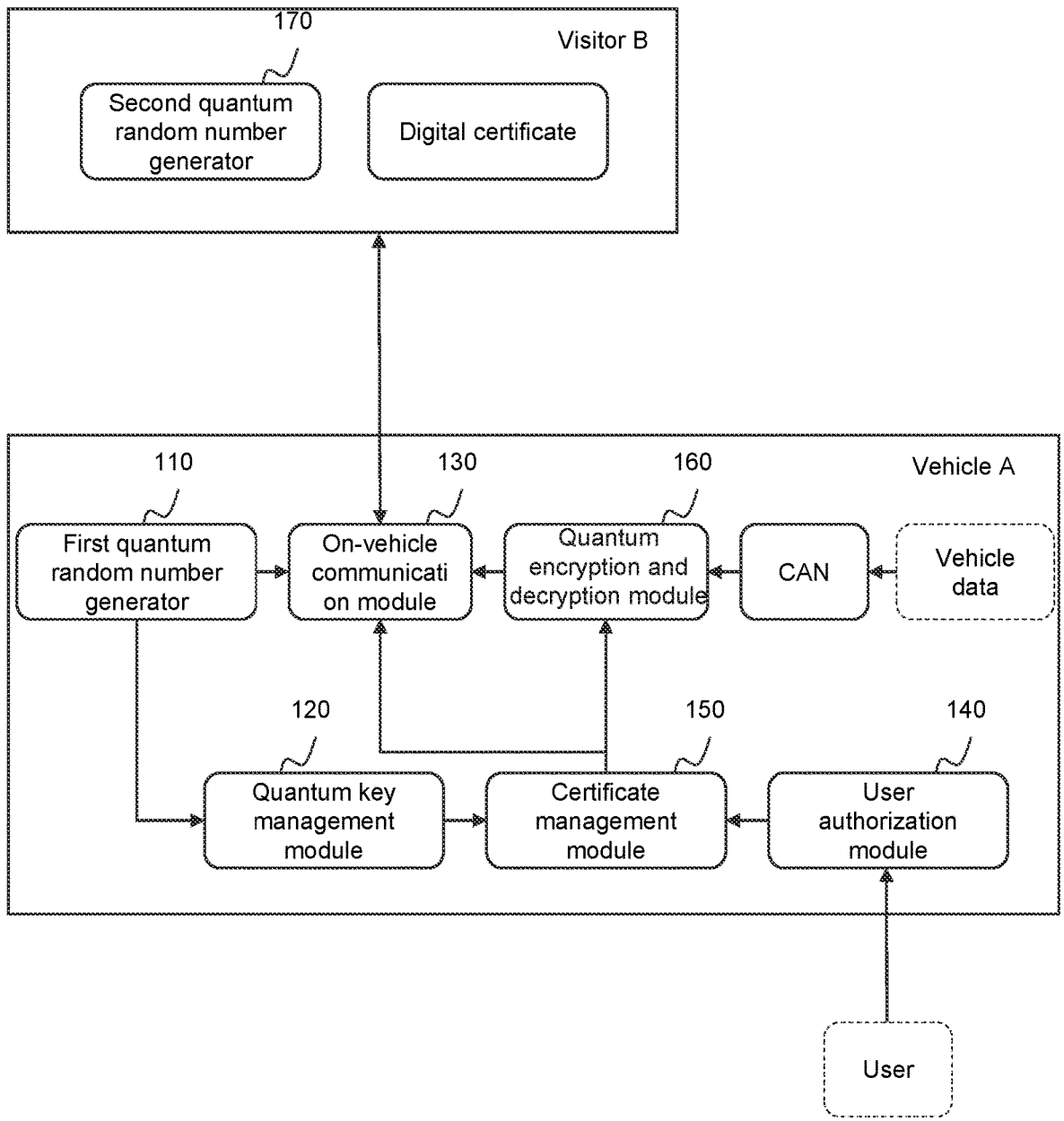
FIG. 1 is a diagram of an exemplary architecture of a system for vehicle encrypted communication for vehicle-road-cloud collaboration according to some embodiments of the present disclosure.

FIG. 1 is a diagram of an exemplary architecture of a system for vehicle encrypted communication for vehicle-road-cloud collaboration according to some embodiments of the present disclosure.

As shown in FIG. 1, the system 100 for vehicle encrypted communication for vehicle-road-cloud collaboration may include a vehicle-side communication unit disposed on a vehicle A and a second quantum random number generator 170 disposed on a visitor B. The vehicle-side communication unit may include a first quantum random number generator 110, a quantum key management module 120, an on-vehicle communication module 130, a user authorization module 140, a certificate management module 150, and a quantum encryption and decryption module 160.

The visitor B refers to a communication device in a vehicle-road-cloud collaboration system. In some embodiments, the visitor B may include other vehicles, cloud sides, and road sides. The visitor B may communicate wired or wirelessly. By interacting with different vehicles, the visitor B may achieve cooperative operation, data sharing, etc., between the vehicles. For example, the vehicle may send vehicle information to the visitor, and the visitor may send a communication request to the vehicle.

In some embodiments, the other vehicle refers to any vehicle other than the vehicle A that may communicate wired or wirelessly. For example, the visitor B refers to any vehicle that is compatible with a vehicular communication (V2V) protocol. The visitor B may communicate via a communication device (e.g., on-vehicle communication module) disposed on the vehicle, share its own sensor data, and receive messages and commands sent by other vehicles or systems.

In some embodiments, the cloud may be a server or a server group, processing data and/or information. For example, the visitor B may be a computer device with one or more components in a cloud server or data center and may be connected to the other devices via a network to access information and/or data stored thereon. In some embodiments, the visitor B may be implemented on a cloud platform. For example, the cloud platform may include a private cloud, a public cloud, a hybrid cloud, a community cloud, a distributed cloud, an inter-cloud, a multi-cloud, or the like, or any combination there.

In some embodiments, the road side may include a road traffic-related device such as a traffic signal device, a traffic control device, or a traffic detection device. For example, the visitor B may be a road-side device installed in road infrastructure, such as a road-side unit, a traffic signal, etc., and the road-side device may communicate wirelessly or wired.

The vehicle A refers to a vehicle that the visitor B wants to communicate with. The vehicle A is a vehicle that may communicate wired or wirelessly. In some embodiments, the vehicle A is provided with a vehicle-side communication module to perform all communication processes related to the vehicle A. The vehicle A may communicate with the visitor B via the vehicle-side communication module.

In some embodiments, the visitor B may communicate with the vehicle A wired (e.g., data cable) or wirelessly (e.g., network). The network may be and/or include a public network (e.g., Internet), a private network (e.g., a local area network (LAN) or a wide area network (WAN)), a wired network (e.g., Ethernet), or any combination thereof. In some embodiments, the network may include one or more network access points.

The second quantum random number generator 170 is used to generate a second quantum random number. The first quantum random number generator 110 is used to generate a first quantum random number. The quantum random number may be generated by the random number generator through a random number generation manner based on a principle of quantum mechanics, which may provide greater security.

The quantum key management module 120 may be connected to the first quantum random number generator 110 through a fiber channel and may be configured to obtain the first quantum random number generated by the first quantum random number generator 110 as a quantum key.

The quantum key refers to a type of encryption key used in quantum communication. The quantum key is generated and transmitted based on the principle of quantum mechanics. The quantum key may be used to provide a relatively high level of security. In embodiments of the present disclosure, the first quantum random number may be used as the quantum key to improve security.

In some embodiments, the quantum key management module 120 is also used to perform update management, charging management, and distribution management of the quantum key. For example, the quantum key management module 120 may use a latest generated first quantum random number as an updated quantum key.

In embodiments of the present disclosure, the quantum key may be generated and managed through the first quantum random number generator and the quantum key management module on the vehicle, and the quantum key is used to encrypt the message content, thereby ensuring the security of the message content.

The on-vehicle communication module 130 is configured to receive an access request from the visitor B and send a digital certificate to the visitor B.

The access request refers to a message request sent by the visitor B to the vehicle A to obtain an access right to the vehicle A or to perform a specific operation.

The digital certificate refers to a type of cryptography used to authenticate an identities and secure communications. In some embodiments, the digital certificate may be used to establish a communication connection between the visitor B and the on-vehicle communication module 130. More descriptions regarding the digital certificate may be found in Table 1 and its relevant descriptions.

The user authorization module 140 is configured to authorize the access request of the visitor B. In some embodiments, a user of the vehicle A decides whether to authorize the access request of the visitor B through the user authorization module 140. The user authorization module 140 requires the user of the vehicle A to personally decide whether to authorize. The user of the vehicle A may be a driver of the vehicle or a registered user corresponding to the vehicle. In some embodiments, the user authorization module 140 may obtain an authorization decision of the user by interacting with the user via text or voice.

In embodiments of the present disclosure, the user authorization module may be disposed on the vehicle, so that when the visitor wants to obtain the access right, the visitor needs to be authorized by the user to obtain the access right, and the owner has the right to control vehicle data.

The certificate management module 150 is configured to generate, based on the access request of the visitor B, the digital certificate corresponding to the access request. In some embodiments, the certificate management module 150 is also configured to store, issue, update, and revoke the digital certificate. In some embodiments, the certificate management module 150 may manage the vehicle access right of the visitor by periodically updating the digital certificate. In some embodiments, for a same visitor, the certificate management module 150 may generate a plurality of corresponding digital certificates based on different access requests, respectively.

In embodiments of the present disclosure, the visitor with the vehicle access right may be managed through the certificate management module, and the vehicle access right of the visitor may be managed by periodically updating the digital certificate, and at the same time, one visitor may apply for a plurality of digital certificates, which may prevent the information of the visitor from being locked by a hacker by periodically replacing the digital certificate, thereby effectively protecting the identity information of the visitor.

The quantum encryption and decryption module 160 is configured to encrypt and decrypt a communication content based on quantum key information in the digital certificate. The communication content includes a communication request content sent by the visitor B to the vehicle A and a vehicle reply content sent by the vehicle A to the visitor B.

In some embodiments, the quantum encryption and decryption module 160 may encrypt and decrypt the communication content in various ways. For example, the quantum encryption and decryption module 160 may perform an encryption and decryption process based on an RSA (Rivest, Shamir, and Adleman) encryption algorithm, an Advanced Encryption Standard (AES).

In some embodiments, the quantum encryption and decryption module 160 may generate the vehicle reply content by obtaining the vehicle data through a Controller Area Network (CAN) communication module.

The CAN communication module refers to a hardware module used to realize the controller area network communication. The CAN communication refers to a commonly used serial communication protocol and is used for communication between electronic devices in automobiles and other industrial fields.

The vehicle data refers to various information related to the vehicle, including an operating status, a performance parameter, etc. of the vehicle. In some embodiments, the vehicle data may be a portion of the vehicle reply content. In some embodiments, the vehicle data includes a large amount of personal information. In current Internet of Vehicles technology applications, the vehicle data may be stored in a vehicle server or a server of a vehicle manufacturer.

In some embodiments, the visitor B may generate the access request and send the access request to the vehicle A, and the on-vehicle communication module 130 of the vehicle A may receive the access request from the visitor B. After the on-vehicle communication module 130 receives the access request from the visitor B, the user may check the access request and decide whether to authorize the access request through the user authorization module 140.

In some embodiments, in response to the access request of the visitor B being authorized, the certificate management module 150 may generate the digital certificate corresponding to the assess request, and the on-vehicle communication module 130 may further send the digital certificate to the visitor B.

The communication connection may be established between the visitor B and the on-vehicle communication module 130 through the digital certificate, the first quantum random number, and the second quantum random number. The communication connection refers to a communication channel established between two or more entities to exchange information or transmit data between the entities. The vehicle A and the visitor B may communicate wired or wirelessly.

After the communication connection is established, the visitor B and the on-vehicle communication module 130 may perform various operations and data interactions. For example, the visitor B may send data requests or commands to the on-vehicle communication module 130, such as requesting to obtain the vehicle status, sending a navigation destination, requesting a vehicle remote operation, etc. After receiving the request, the on-vehicle communication module 130 may respond and provide the corresponding data or perform the corresponding operation.

In some embodiments, the digital certificates received by the visitor B have a unique identification number (i.e., a certificate serial number). At the time of establishing the communication connection, the on-vehicle communication module 130 may identify the visitor B based on the certificate serial number of the digital certificates transmitted by the visitor. The certificate serial number of each digital certificate uniquely corresponds to one visitor. Even though one visitor has the plurality of digital certificates, i.e., one visitor corresponds to the plurality of digital certificates, but each digital certificate has only one visitor uniquely corresponding to the digital certificate.

In embodiments of the present disclosure, the certificate management module may be disposed on the vehicle. When the visitor wants to obtain the access right, the visitor needs to obtain the user authorization of the user authorization module and the digital certificate generated by the certificate management module. Only a visitor who owns an authentic digital certificate may access the vehicle, and a visitor who is not authorized or who does not have the authentic digital certificate may not access the vehicle, which may ensure that the message is protected from the hacker in the transmission process using the digital certificate, or even if the transmission process is invaded, the content of the message may not be viewed.

In some embodiments, the digital certificate may include the certificate serial number, certificate validity, a certificate validity time, visitor information, the quantum key information, and a signature algorithm.

The certificate serial number is the unique identification number of the digital certificate. For example, the certificate serial number may be represented as a number, a letter, a symbol, or any combination thereof.

The certificate validity time refers to a validity time range of the digital certificate, including a start time and an end time. In some embodiments, the certificate validity time is generated based on an access time of the visitor B determined by the user. For example, the start time of the certificate validity time may be a time when the access request is authorized, and the end time of the certificate validity time may be the access time determined by the user authorized. The access time of the visitor B determined by the user may be determined based on the access request of the visitor B.

The certificate validity refers to an attribute of whether the certificate is in a valid state. In some embodiments, the certificate validity may be determined based on the certificate validity time. When an actual access time of the visitor B is within the certificate validity time, the certificate validity is valid. When the actual access time of the visitor B is outside the certificate validity time, the certificate validity is invalid. That is, when the actual access time of the visitor B exceeds the access time determined by the user, the digital certificate is no longer valid.

The visitor information refers to device information of the visitor B. For different types of the visitor B, the device information is different due to the different devices.

The device information may include a device type, device identification information, device attribute information, etc.

In some embodiments, the quantum key information may include the quantum key, a quantum encryption and decryption algorithm, and a quantum key expiration time.

The quantum encryption and decryption algorithm refers to an algorithm used to perform encryption and decryption operations on the quantum key. For example, the quantum encryption and decryption algorithm may include a quantum key distribution protocol Bennett-Brassard (BB84) algorithm, a Quantum Key Distribution E91 Protocol algorithm, the RSA encryption algorithm, a national commercial cipher SM4 algorithm, etc. The quantum encryption and decryption module may encrypt and decrypt the communication content according to the stored quantum encryption and decryption algorithm.

The quantum key expiration time refers to a validity period of the quantum key. Each quantum key has a corresponding quantum key expiration time. The quantum key expires if the access time of the visitor B exceeds the quantum key expiration time. In some embodiments, in response to expiration of the quantum key in a certain digital certificate managed by the certificate management module 150, the quantum key management module 120 updates the quantum key of the certain digital certificate. After the digital certificate managed by the certificate management module 150 is updated, the on-vehicle communication module 130 may resend the updated digital certificate to the visitor B.

In some embodiments, the quantum key management module 120 may generate a new quantum key and associate the new quantum key with a corresponding certificate. The certificate management module 150 may update the corresponding digital certificate after receiving the updated quantum key.

The signature algorithm refers to an algorithm that performs signature-related processing on the information. In some embodiments, the signature algorithm includes a digest algorithm and a signature encryption algorithm. The digest algorithm is configured to generate a digest, and the signature encryption algorithm is configured to perform signing to generate a signature value.

In some embodiments, the digest algorithm (also referred to as a hash algorithm) may be used to generate a digest. For example, the digest algorithm includes a Message-Digest Algorithm 5 (MD5), a Secure Hash Algorithm 256-bit (SHA-256) algorithm, etc.

In some embodiments, the signature encryption algorithm is used to perform signing to generate the signature value. For example, the signature encryption algorithm includes an RSA asymmetric encryption algorithm, a Digital Signature Algorithm (DSA), etc.

The digest refers to an output result of a fixed length generated by processing data or message of an arbitrary length through the digest algorithm, i.e., a digest value or hash value. By comparing the digest values, it is possible to quickly detect whether the data has been tampered with or corrupted, and it is also possible to verify the consistency of the data.

The signature value refers to a digital signature generated by encrypting the data using a private key. A unique signature value may be generated by performing the encryption operation on the data using the private key in the digital signature process. More descriptions regarding the private key may be found in FIG. 3 and the related descriptions thereof.

In some embodiments, the content of the digital certificate may be as shown in Table 1 below.

TABLE 1

Digital Certificate

| Content items of the digital certificate | | Remark |
|---|---|---|
| certificate serial number | | unique identification number |
| certificate validity | | Whether still valid or not |
| signature algorithm | digest algorithm | hashing algorithm configured to generate a digest |
| | signature encryption algorithm | configured to perform signing to generate a signature value |
| certificate validity time | start time | time when the access request is authorized |
| | end time | time with a set range |
| visitor information | | device information of the visitor |
| quantum key information | quantum encryption and decryption algorithm | / |
| | quantum key | / |
| | quantum key expiration time | / |

In some embodiments, the digital certificate generated by the certificate management module 150 may be managed through a certificate management list. The certificate management list includes a total count of issued digital certificates and content of the issued digital certificates. The content of the certificate management list may be shown in Table 2 below:

TABLE 2

Certificate management list

| Content items of certificate management list total count of issued digital certificates | | Remark |
|---|---|---|

TABLE 2-continued

Certificate management list

| Content of issued digital certificate(s) | certificate serial number | | unique identification number |
|---|---|---|---|
| | certificate validity | | Whether still valid or not |
| | signature algorithm | digest algorithm | hashing algorithm configured to generate a digest |
| | | signature encryption algorithm | configured to perform signing to generate a signature value |
| | certificate validity time | start time | time when the access request is authorized |
| | | end time | Set access time |
| | visitor information | | device information of the visitor |
| | quantum key information | quantum encryption and decryption algorithm | / |
| | | quantum key | / |
| | | quantum key expiration time | / |

In some embodiments of the present disclosure, the quantum key and the encryption algorithm may be used, so that the system may provide increased security and protect the confidentiality of sensitive data, and at the same time, guarantee authentication and data integrity of communications. The various modules of the system 100 for vehicle encrypted communication for vehicle-road-cloud collaboration work collaboratively, which may guarantee secure communication and data transmission between the vehicle and the visitor.

More descriptions regarding the various modules may be found in FIGS. 2-6 and their relevant descriptions.

It should be noted that the above description of the system 100 for vehicle encrypted communication for vehicle-road-cloud collaboration and its modules is provided only for convenience of description, and is not intended to limit the present disclosure to the scope of the illustrated embodiments. It should be understood that for those skilled in the art, after understanding the principle of the system, it may be possible to arbitrarily combine the various modules or form a sub-system to connect with other modules without departing from this principle. In some embodiments, the first quantum random number generator 110, the quantum key management module 120, the on-vehicle communication module 130, the user authorization module 140, the certificate management module 150, the quantum encryption and decryption module 160, and the second quantum random number generator 170 disclosed in FIG. 1 may be different modules in a single system, or a single module realizing the functions of two or more of the modules. For example, the various modules may share a common storage module, and the modules may each have a respective storage module. Such modifications are within the scope of protection of the present disclosure.

FIG. 2 is an exemplary flowchart of a process of a method for vehicle encrypted communication for vehicle-road-cloud collaboration according to some embodiments of the present disclosure. In some embodiments, the process 200 may be performed by the system 100 for vehicle encrypted communication for vehicle-road-cloud collaboration.

As shown in FIG. 2, process 200 specifically includes the following operation.

In Step 210, a vehicle A generates a digital certificate and sends the digital certificate to a visitor B.

In some embodiments, when the visitor B wants to communicate with the vehicle A, the visitor B may generate an access request and send it to the vehicle A. The access request may include visitor information of the visitor B, an access right of the vehicle A that the visitor B wants to obtain, or a specific operation to perform.

In some embodiments, the on-vehicle communication module 130 may receive the access request from the visitor B. In some embodiments, after the on-vehicle communication module 130 receives the access request from the visitor B, a user of the vehicle A may check the access request and decide whether to authorize the access request through the user authorization module 140.

In some embodiments, in response to the user deciding to authorize the access request of the visitor B, the certificate management module 150 may generate the digital certificate corresponding to the access request and the on-vehicle communication module 130 may send the digital certificate to the visitor B. In some embodiments, in response to the user deciding not to authorize the access request of the visitor B, the vehicle A may discard the access request.

More descriptions regarding the on-vehicle communication module 130, the user authorization module 140, and the certificate management module 150 may be found in FIG. 1 and its related descriptions. More descriptions regarding the operation 210 may be found in FIG. 3 and its related descriptions.

In Step 220, a communication connection is established between the visitor B and the on-vehicle communication module 130 through the digital certificate, a first quantum random number, and a second quantum random number.

In some embodiments, a communication connection may be established between the visitor B and the on-vehicle communication module 130. The digital certificate is used for authentication, and the first quantum random number and the second quantum random number are used to ensure the security of communication. After the communication connection is established, the visitor B and the on-vehicle communication module 130 may perform various operations and data interactions. More descriptions regarding the operation 220 may be found in FIG. 4 and its related descriptions.

In embodiments of the present disclosure, the quantum random numbers may be generated in real time using a quantum random number generator on the vehicle and the visitor, and the quantum random numbers may be added to the message to prevent the message from being attacked. Since the random number used in the prior art is a pseudo-random number, a random seed and the random number exist in the message in a complete form, and there is a functional relationship between the random seed and the random number, if a hacker analyzes a mapping relationship by intercepting the message in large quantities, there is a possibility that the functional relationship is broken. However, in the embodiments of the present disclosure, the quantum random number generator physically generates a true random number that cannot be known in advance.

It should be noted that the description of the process 200 is merely for the purpose of illustration and is not intended to limit the scope of the present disclosure. For those skilled in the art, various modifications and changes may be made to the process 200 under the guidance of the present disclosure. However, such modifications and changes remain within the scope of the present disclosure.

FIG. 3 is an exemplary flowchart of a process for generating, by a vehicle A, a digital certificate and sending the digital certificate to a visitor B according to some embodiments of the present disclosure. In some embodiments, process 300 may be implemented by the system 100 for vehicle encrypted communication for vehicle-road-cloud collaboration to achieve the operation 210 in the process 200.

As shown in FIG. 3, process 300 includes the following operations.

In Step 310, a visitor B generates an access request, a visitor public key Pb and a visitor private key Sb corresponding to the visitor B and sends the access request together with the visitor public key Pb to a vehicle A.

The visitor public key refers to a public key used by the visitor B when using a public key encryption technology. The public key encryption technology encrypts and decrypts data using a pair of keys, including the public key and the private key. The public key is used to encrypt data, and the private key is used to decrypt data. In some embodiments, the visitor B generates the access request, the visitor public key Pb and the visitor private key Sb corresponding to the visitor B. The visitor public key Pb is public information of the visitor B that may be shared with the vehicle A. The vehicle A may encrypt data using the visitor public key Pb to ensure that only the visitor B may decrypt and read the data. The visitor private key Sb is private information of the visitor B, and only the visitor B knows the visitor private key Sb.

In Step 320, a user of the vehicle A may check the access request and decide whether to authorize the access request of the visitor B through the user authorization module 140 after the on-vehicle communication module 130 of the vehicle A receives the access request and the visitor public key Pb.

In some embodiments, after the visitor B sends the access request and the visitor public key Pb to the vehicle A, the on-vehicle communication module 130 of the vehicle A may receive the access request and the visitor public key Pb. After receiving the relevant information, the vehicle A needs to obtain an authorization decision through the user authorization module 140.

The user authorization module 140 requires the user of the vehicle A to personally decide whether to authorize or not, and may not decide whether to authorize on its own. The user of the vehicle A may be a driver of the vehicle or a registered user corresponding to the vehicle. In some embodiments, the user authorization module 140 may interact with the user via text or voice to obtain the authorization decision of the user. The user of the vehicle A may also check the access request through the user authorization module 140. For example, the user authorization module 140 may display the access request on a display device for the user to check.

In step 330, the certificate management module 150 generates the digital certificate and a vehicle public key Pa and a vehicle private key Sa corresponding to the vehicle A after the user authorizes the access request of the visitor B and determines an access time of the visitor B.

The access time refers to a time or a time period specified by the user during which the visitor B may access the vehicle A. In some embodiments, the access time of the visitor B needs to be determined by the user. The access time determined by the user may be a specific date, a time range, or a duration.

In some embodiments, the user may determine the access time of the visitor B based on the access request of the visitor B. For example, the user may determine different times or time periods based on a request type of the access request.

In some embodiments, the certificate management module 150 may generate the digital certificate corresponding to the access request and the vehicle public key Pa and the vehicle private key Sa corresponding to the vehicle A based on the access request.

The vehicle public key Pa is public information of the vehicle. The vehicle public key Pa may be used to encrypt data or authenticate and may be shared with the visitor B. The visitor B may encrypt the data using the vehicle public key Pa to ensure that only the vehicle A may decrypt and read the data. The vehicle private key Sa is private information of the vehicle, and only the vehicle knows the vehicle private key Sa that may be used to decrypt the data.

In some embodiments, the digital certificate may include a certificate serial number, certificate validity, a certificate validity time, visitor information, quantum key information, and a signature algorithm. The certificate validity time may be determined based on the access time determined by the user, and the certificate validity may be determined based on the certificate validity time. More descriptions regarding the digital certificate may be found in FIG. 1 and its related descriptions.

In step 340, the on-vehicle communication module 130 generates a certificate digest of the of the digital certificate based on a digest algorithm, generates a first signature value x1 of the digital certificate by performing signing on the certificate digest based on the vehicle private key Sa and a signature encryption algorithm in the digital certificate, and obtains an encrypted digital certificate by encrypting the digital certificate accompanied with the first signature value x1 and the vehicle public key Pa based on the visitor public key Pb, and the on-vehicle communication module 130 sends the encrypted digital certificate to the visitor B.

At the same time, the certificate management module 150 stores the digital certificate.

In some embodiments, the on-vehicle communication module 130 may obtain the certificate digest by processing the digital certificate based on the digest algorithm. The certificate digest refers to a fixed-length representation of the contents of the digital certificate and is used to verify the integrity of the digital certificate. In some embodiments, the certificate digest may be generated based on the digest algorithm, such as an MD5 algorithm or an SHA-256 algorithm. By comparing the certificate digests, it is possible to quickly detect whether the digital certificate is tampered with or corrupted, and it is also possible to verify the consistency of the data.

In some embodiments, the on-vehicle communication module 130 generates the first signature value x1 by perform signing on the certificate digest based on the vehicle private key Sa and the signature encryption algorithm in the digital certificate. The first signature value x1 refers to a digital signature generated by encrypting the data using the private key. An unique signature value may be generated by performing an encryption operation on the data using the private key in the digital signature process. By using the first signature value x1, other entities may verify the authenticity and integrity of the digital certificate using the vehicle public key Pa associated with the vehicle A.

In some embodiments, the on-vehicle communication module 130 may obtain the encrypted digital certificate by encrypting the digital certificate accompanied with the first signature value x1 and the vehicle public key Pa based on the visitor public key Pb. The encrypted digital certificate may be shared with the visitor B. The digital certificate may be encrypted with the visitor public key Pb, which ensures that only the visitor B may decrypt and read the data.

In some embodiments, the on-vehicle communication module 130 may send the encrypted digital certificate to the visitor B. Meanwhile, the certificate management module 150 stores the digital certificate and/or the encrypted digital certificate for subsequent verification of the digital certificate.

In step 350, the visitor B obtains the digital certificate, the accompanying first signature value x1, and the vehicle public key Pa by decrypting the encrypted digital certificate based on the visitor private key Sa after receiving the encrypted digital certificate, generates a certificate digest of the digital certificate based on the digest algorithm, generates a second signature value x2 by performing signing on the certificate digest based on the vehicle public key Pa and the signature encryption algorithm in the digital certificate, and compares the generated second signature value x2 with the accompanying first signature value x1. In response to the generated second signature value x2 being consistent with the accompanying first signature value x1, and the digital certificate is authentic, the visitor B stores the digital certificate locally. In response to the generated second signature value x2 being inconsistent with the accompanying first signature value x1 and the digital certificate being fake, the visitor B discards the digital certificate.

In some embodiments, after receiving the encrypted digital certificate, the visitor B may obtain the digital certificate, the accompanying first signature value x1, and the vehicle public key Pa by decrypting the encrypted digital certificate based on the vehicle private key Sb. Since the digital certificate is encrypted using the visitor public key Pb, the visitor B may decrypt the encrypted digital certificate using the vehicle private key Sb. Only the visitor B knows the vehicle private key Sb, therefore only the visitor B may decrypt the digital certificate.

In some embodiments, the visitor B may generate the certificate digest by processing the decrypted digital certificate based on the digest algorithm. The visitor B needs to use the same digest algorithm as the on-vehicle communication module 130.

In some embodiments, the visitor B may generate the second signature value x2 of the digital certificate by signing on the certificate digest based on the vehicle public key Pa and the signature encryption algorithm in the digital certificate. The second signature value x2 refers to a digital signature generated by encrypting the data using the public key. In the digital signature process, the unique signature value may also be generated by encrypting the data using the public key. The visitor B needs to use the same signature encryption algorithm as the on-vehicle communication module 120.

In some embodiments, the visitor B may compare the generated second signature value x2 with the accompanying first signature value x1 to verify the authenticity of the digital certificate. The second signature value x2 and the first signature value x1 are respectively generated by the vehicle public key Pa and the vehicle private key Sa, and they are generated based on the same signature encryption algorithm. Therefore, the authenticity of the digital certificate may be verified by comparing whether the second signature value x2 is consistent with the first signature value x1.

In some embodiments, in response to the generated the second signature value x2 being consistent with the accompanying first signature value x1 and the digital certificate being authentic, the visitor B may store the digital certificate locally, and the stored digital certificate may be used for subsequent communication. In some embodiments, in response to the generated the second signature value x2 being inconsistent with the accompanying first signature value x1 and the digital certificate being fake, the visitor B discards the digital certificate.

In some embodiments of the present disclosure, the request verification process between the visitor B and the vehicle A is encrypted using the visitor public key Pb, the visitor private key Sb, the vehicle public key Pa, and the vehicle private key Sa, which ensures the security and validity of the communication. Additionally, the on-vehicle communication module 130 and the visitor B perform signing on the digital certificate using the signature encryption algorithm, respectively, and the visitor B compares the two generated signature values, which verifies the authenticity of the digital certificate.

In the embodiments of the present disclosure, a symmetric encryption technology is combined with an asymmetric encryption technology, which ensures message security, and at the same time, optimizes the message transmission efficiency. Since message transmission during the communication process has strict requirements for timeliness, and an updating cycle of the digital certificate has less stringent requirements for temporal accuracy, the digital certificate in the embodiments of the present disclosure is issued through a public-private key cryptosystem (asymmetric encryption technology), and messages with real-time requirements is transmitted through the quantum key (symmetric encryption technology) with a faster encryption speed. The symmetric encryption means that an encrypting party and a decrypting party use the same key for encryption and decryption. The asymmetric encryption algorithm is different from the symmetric encryption algorithm in that the asymmetric encryption algorithm requires two keys, namely, public and private keys corresponding to each other.

It should be noted that the description of the process 300 is merely provided for the purpose of example and illustration and is not intended to limit the scope of application of the present disclosure. For those skilled in the art, various modifications and changes may be made to the process 300 under the guidance of the present disclosure. However, these modifications and changes remain within the scope of the present disclosure.

Figure 4:
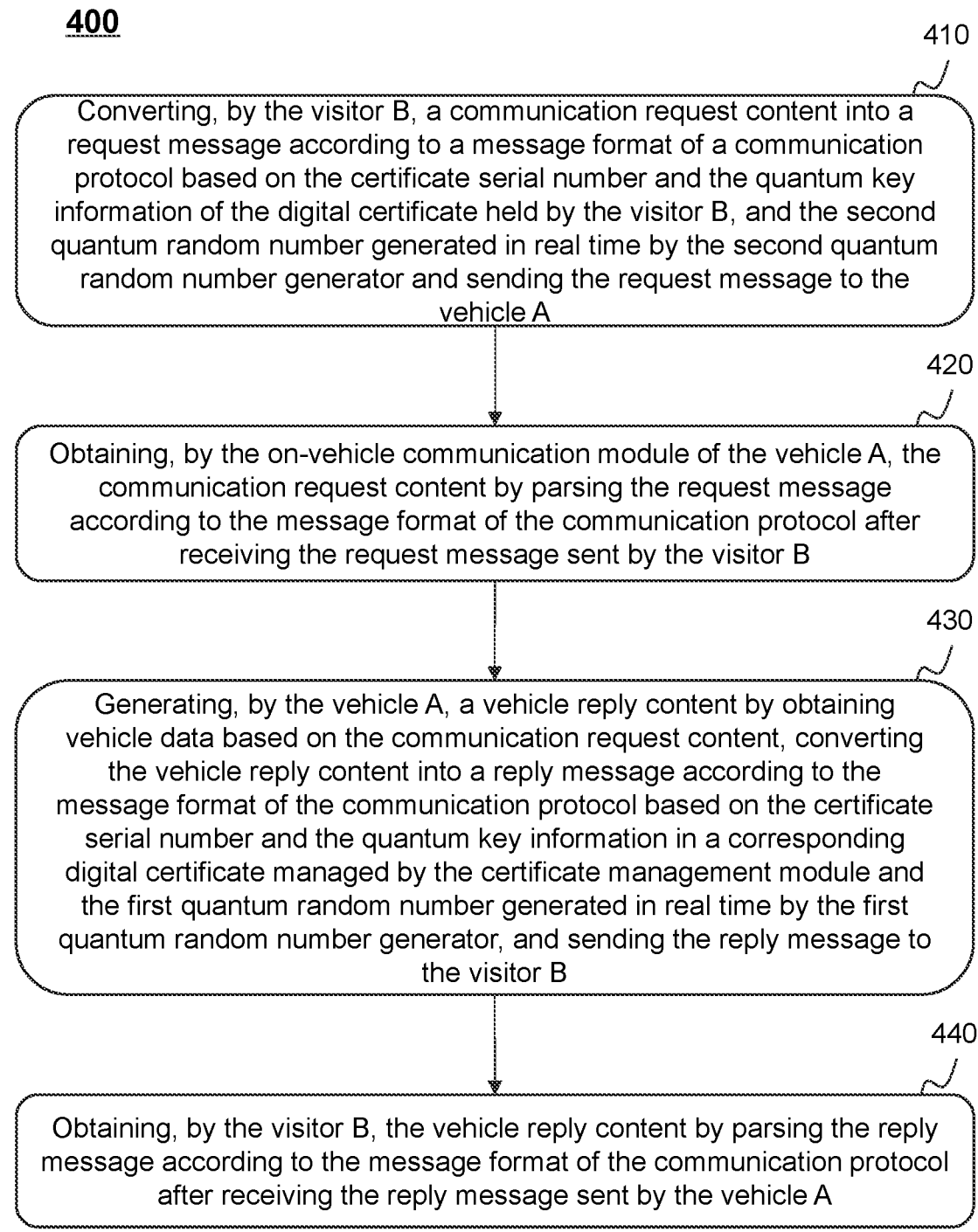
FIG. 4 is an exemplary flowchart of a process for establishing a communication connection between a visitor B and a vehicle A according to some embodiments of the present disclosure.

FIG. 4 is an exemplary flowchart of a process for establishing a communication connection between a visitor B and a vehicle A according to some embodiments of the present disclosure. In some embodiments, process 400 may be performed by the system 100 for vehicle encrypted communication for vehicle-road-cloud collaboration to realize the operation 220 of the process 200.

As shown in FIG. 4, process 400 specifically includes the following operations.

In Step 410, the visitor B converts a communication request content into a request message according to a message format of a communication protocol based on a certificate serial number and quantum key information of a digital certificate held by the visitor B, and a second quantum random number generated in real time by the second quantum random number generator 170 and sends the request message to the vehicle A.

The communication protocol refers to a rule or convention that defines a manner and format of communication between communicating entities. The message format of the communication protocol refers to a structure and organization of the message defined in the communication protocol, which specifies a meaning, order, and encoding of each field of the message. The message format of the communication protocol is usually expressed in binary or textual form, so that the communicating entity may understand and parse the content of the message. Communication is performed through the message format of the communication protocol, which ensures the reliability, security, and interoperability of the communication.

The communication request content refers to a specific content of the request sent by the visitor B to the vehicle A. The communication request content may include data that the visitor B wants to obtain or an operation that the visitor B wants to perform.

The request message refers to a message obtained by transforming the communication request content by the visitor B based on the message format of the communication protocol. The request message is organized and encoded according to the format specified in the communication protocol, and it includes information such as the fields, identifiers, or lengths of the communication request content. In some embodiments, the request message includes all content of the communication request content and further includes the certificate serial number and the quantum key information of the visitor B, and the second quantum random number generated in real time. In some embodiments, the visitor B may send the converted request message to the vehicle A.

In step 420, the on-vehicle communication module 130 of the vehicle A obtains the communication request content by parsing the request message according to the message format of the communication protocol after receiving the request message sent by the visitor B.

In some embodiments, a message format of the communication protocol parsed by the vehicle A is the same as the message format of the communication protocol converted by the visitor B. More descriptions regarding parsing the request message may be found in the operations 421 to 425 and their related descriptions below.

In step 430, the vehicle A generates a vehicle reply content by obtaining vehicle data based on the communication request content, converting the vehicle reply content into a reply message according to the message format of the communication protocol based on the certificate serial number and the quantum key information in a corresponding digital certificate managed by the certificate management module 150 and the first quantum random number generated in real time by the first quantum random number generator 110, and sending the reply message to the visitor B.

The vehicle reply content refers to a specific content of a reply generated by the vehicle A based on the received communication request content and the vehicle data. The vehicle reply content may include vehicle status information, command response, sensor data, etc. In some embodiments, the vehicle reply content refers to a response from the vehicle A to a request of the visitor B and is used to transmit the required information to the visitor B or perform the corresponding operation.

The reply message refers to a message obtained by the vehicle A by converting the vehicle reply content based on the message format of the communication protocol. The reply message is organized and encoded according to the format specified in the communication protocol, and it includes information such as various fields, identifiers, lengths, etc., of the vehicle reply content.

In some embodiments, the reply message includes all contents of the vehicle reply content and further includes the certificate serial number and quantum key message in the corresponding digital certificate managed by certificate management module 150 and the first quantum random number generated in real time. The corresponding digital certificate managed by the certificate management module 150 corresponds to the digital certificate in the request message, i.e., the corresponding digital certificate is the digital certificate generated and stored by the vehicle A in the operations 330 and 340 according to the access request of the visitor B.

In some embodiments, the on-vehicle communication module 130 may send the converted reply message to the visitor B to transmit the vehicle reply content to the visitor B for parsing and processing.

In step 440, the visitor B obtains the vehicle reply content by parsing the reply message according to the message format of the communication protocol after receiving the reply message sent by the vehicle A.

More descriptions regarding parsing the reply message may be found in the operations 441 to 445 and their relevant descriptions below. The vehicle reply content obtained by parsing may include the vehicle data that the visitor B wants to obtain.

In some embodiments, when the data or operation that the visitor B wants to obtain or perform has been successful, the communication may be terminated, i.e., no more information is sent to the vehicle A. In some embodiments, if the visitor still needs to continue communicating with the vehicle A to obtain more data or perform more operations, the process of the operation 410 to the operation 440 may be repeated until the digital certificate of the visitor B becomes invalid.

In some embodiments, the structure of the request message or the reply message may include, in order, a start identifier, a message header, a message body, and an end identifier. A structure of the request message or the reply message may be as shown in Table 3 below.

TABLE 3

Message structure

| start identifier | message header | message body | end identifier |
|---|---|---|---|

The start identifier refers to a start flag of the message and is used to identify a start position of the message. The start identifier may be a specific byte sequence or character. The message header refers to a header portion of the message and includes metadata and control information about the message. The message header may include information such as a message type, a version number, a length, checksum and is used to identify and parse the message. The message body refers to a main portion of the message and includes an actual data content or command information. The end identifier refers to an end flag of the message and is used to identify an end position of the message. The end identifier may also be a specific byte sequence or character.

In some embodiments, both the start identifier and the end identifier are two characters, such as ** or ##.

In some embodiments, a content in the message header may include in turn a message type, a message length, the certificate serial number, a timestamp, and a message serial number. The message type may include a type of the request message sent by the visitor B to the vehicle A and a type of the reply message sent by the vehicle A to the visitor B. The timestamp refers to a timestamp at which the request message or reply message was generated. The content in the message header, examples of content, and related descriptions thereof are shown in Table 4 below.

TABLE 4

Message header

| Definition of content | Length of bytes | Example | Remark |
|---|---|---|---|
| message type | 3 | 101: type of the request message 102: type of the reply message | prevent a reflection attack |
| message length | 4 | 0213 | representing that the message length is 213 and used to parse the message body |
| certificate serial number | 8 | 12345678 | used to verify the authenticity of the digital certificate |
| timestamp | 17 | 20220823161229728 | representing 16:12:29 and 728 milliseconds on Aug. 23, 2022, which is a time-varying parameter and is used to verify that the message is not replayed |
| message serial number | 3 | 001 | representing that the message sequence number is 1, which is a time-varying parameter and is used to verify that the message is not replayed |

The message type refers to a type used to identify the message, including the type of the request message and the type of the reply message. In some embodiments, the message type may be identified by a specific number. For example, 101 may represent the type of the request message, and 102 may represent the type of the reply message. The message type may be used to prevent a reflection attack.

The message length refers to a length or a count of bytes of the message body, which indicates an actual size of the data occupied by the message body.

The certificate serial number refers to a unique serial number of the digital certificate. The digital certificate is an important component used for authentication and secure communication, and the certificate serial number is used to identify a specific certificate entity.

The timestamp refers to a time at which the request message or the reply message is generated and is used for time-related authentication. The timestamp may be represented by a specific time format or timestamp and is used to record time information of the message. For example, the timestamp may be represented by a series of numbers.

The message serial number refers to a sequence number or number used to identify a message. The message serial number may be an incremental integer value that uniquely identifies each message. The message sequence number may be used for a task such as message replay detection, sequentially validation, or message de-duplication.

In some embodiments, a content in the message body may include in turn an encrypted communication request content or an encrypted vehicle reply content, a message digest, a second quantum random number or a first quantum random number, and a random number signature value. The message body of the request message may include the encrypted communication request content, the message digest, the second quantum random number, and the random number signature value. The message body of the reply message may include the encrypted vehicle reply content, the message digest, the first quantum random number, and the random number signature value.

The encrypted communication request content or the encrypted vehicle reply content is obtained by encrypting the communication request content or the vehicle reply content using the quantum encryption and decryption algorithm and the quantum key in the quantum key information. The message digest is obtained by performing the digest algorithm on all contents from the message header to the message digest. The second quantum random number is generated in real time by the second quantum random number generator 170. The first quantum random number is generated in real time by the first quantum random number generator 110. The random number signature value is generated by the visitor B performing signing on the second quantum random number based on a visitor private key Sb, or by the vehicle A performing signing on the first quantum random number based on a vehicle private key Sa.

The content and content descriptions in the message body may be shown in Table 5 below:

TABLE 5

| Message body | |
|---|---|
| Definition of content | Remark |
| encrypted content | Referring to GB/T 32960.3-2016, the encrypted content is obtained after the content is encrypted using the quantum key and an SM4 quantum encryption and decryption algorithm. |
| message digest | The message digest is obtained by performing an SHA-256 digest algorithm on all contents from the message header to the message digest. |
| second quantum random number/first quantum random number | quantum random number generated by the second quantum random number generator/the first quantum random number generator |
| random number signature value | The random number signature value is generated by the visitor performing signing on the quantum random number based on a visitor private key and the signature encryption algorithm. |

In some embodiments, the process of obtaining, by the on-vehicle communication module 130, the communication request content by parsing the request message in the operation 420 may include the following operations 421~425.

In Step 421, the on-vehicle communication module 130 determines whether the message type in the request message is the type of the request message sent by the visitor B to the vehicle A. The message type includes the type of the request message and the type of the reply message, and at this time, the message type of the request message may need to be the type of the request message type, which may be represented by 101.

In some embodiments, in response to the message type in the request message being the type of the request message sent by the visitor B to the vehicle A, i.e., the message type in the request message is a request message type 101, the process proceeds to step 422.

In some embodiments, in response to the message type in the request message not being the type of the request message sent by the visitor B to the vehicle A, i.e., the message type in the request message being the reply message type 102, the message type in the request message is incorrect, and the request message may be discarded. At this time, the communication connection fails to be established between the vehicle A and the visitor B.

In Step 422, the on-vehicle communication module 130 reads the certificate serial number in the request message and verifies the certificate serial number in the request message.

In some embodiments, the verification process may include: determining whether the certificate management module 150 includes a digital certificate corresponding to a certificate serial number that is consistent with the certificate serial number in the request message by the on-vehicle communication module 130 retrieving in the digital certificate managed by the certificate management module 150.

A plurality of digital certificates may be stored in the certificate management module 150, and the digital certificate corresponding to the certificate serial number that is consistent with the certificate serial number in the request message is the one obtained by the visitor B in this access request. Only the certificate serial numbers match, it indicates that the digital certificate held by the visitor B is an authentic certificate, which may be used to establish the communication connection between the visitor B and the vehicle A.

In some embodiments, in response to a determination that the certificate management module 150 does not include the digital certificate corresponding to the certificate serial number that is consistent with the certificate serial number in the request message, representing the digital certificate held by the visitor B being a fake certificate, the request message is discarded, and the communication connection fails to be established between the vehicle A and the visitor B.

In some embodiments, in response to a determination that the certificate management module 150 includes the digital certificate corresponding to the certificate serial number that is consistent with the certificate serial number in the request message, representing the digital certificate held by the visitor B being an authentic certificate, the on-vehicle communication module 130 may further determine the certificate validity, the certificate validity time, and the visitor information of the corresponding digital certificate managed by the certificate management module 150. In some embodiments, in response to the corresponding digital certificate being valid, the timestamp in the request message being within the certificate validity time, and the visitor information being consistent with the device information of the visitor B, the process proceeds to step 423. In response to the digital certificate being invalid, the timestamp in the request message being not within the certificate validity time, or the visitor information being inconsistent with the device information of the visitor B, the request message may be discarded, and the communication connection fails to be established between the vehicle A and the visitor B.

In Step 423, the on-vehicle communication module 130 may generate the message digest by performing the digest algorithm processing on all the contents of the request message from the message header to the message digest based on the digest algorithm and compare the generated message digest with the message digest in the request message. The generated message digest may be compared with the message digest in the request message, which may further verify whether the request message has been tampered with and improve communication security.

In some embodiments, in response to the generated message digest being consistent with the message digest in the request message, representing the request message being not tampered with, the process proceeds to step 424.

In some embodiments, in response to the generated message digest being inconsistent with the message digest in the request message, representing the request message being tampered with, the request message is discarded, and the communication connection fails to be established between the vehicle A and the visitor B.

In Step 424, the on-vehicle communication module 130 generates a random number signature value by performing signing on the second quantum random number in the request message based on a visitor public key Pb, and compares the generated random number signature value with the random number signature value in the request message.

In some embodiments, in response to the generated random number signature value being consistent with the random number signature value in the request message, representing the request message being sent by a holder (i.e., the visitor B) of the visitor private key Sb, the process proceeds to step 425.

In some embodiments, in response to the generated random number signature value being inconsistent with the random number signature value in the request message, representing the request message being not sent by the holder (i.e., the visitor B) of the visitor private key Sb, the request message is discarded, and the communication connection fails to be established between the vehicle A and the visitor B.

The random signature value refers to a value generated by the on-vehicle communication module 130 performing signing on the second quantum random number in the request message based on the visitor public key of Pb. This value is used to verify the legitimacy of the request message and ensure that the message is sent by the visitor B and that the visitor B is a legitimate user who holds the private key Sb corresponding to the public key Pb. The generated random number signature value may be compared with the random number signature value in the request message, which verifies whether the request message is sent by the visitor B and improves the communication security.

In Step 425, the on-vehicle communication module 130 obtains the communication request content by the quantum encryption and decryption module 160 decrypting the encrypted communication request content in the request message based on the quantum key information in the corresponding digital certificates managed by the certificate management module 150, the quantum key and the quantum encryption and decryption algorithm.

In some embodiments, after the encrypted communication request content is decrypted, it is determined whether the quantum key expires based on the quantum key information in the corresponding digital certificate managed by the certificate management module 150. In some embodiments, in response to a determination that the quantum key in a certain digital certificate managed by the certificate management module 150 expires, the quantum key management module 120 may update the quantum key of the digital certificate. After the digital certificate is updated, the on-vehicle communication module 130 sends the updated digital certificate along with the reply message to the visitor B.

In some embodiments of the present disclosure, the on-vehicle communication module may parse and verify the request message of the visitor B, including verifying the message type, the certificate serial number, the integrity of the message, and the validity of the signature, so as to ensure that the secure communication connection with the visitor B and obtain the communication request content for subsequent processing.

In some embodiments, the process of obtaining, by the visitor B, the vehicle reply content by parsing the reply message in the operation 440 may include the following operations 441-445.

In Step 441, the visitor B determines whether a message type in the reply message is the type of the reply message sent by the vehicle A to the visitor B based on the message type in the reply message.

In some embodiments, in response to the message type in the reply message being the type of the reply message sent by the vehicle A to the visitor B, i.e., the message type in the reply message being the reply message type 102, the process proceeds to step 422.

In some embodiments, in response to the message type in the reply message not being the type of the reply message sent by the vehicle A to the visitor B, i.e., the message type in the reply message being the request message type 101, the message type of the reply message is incorrect, and the reply message may be discarded.

In Step 442, the visitor B reads the certificate serial number in the reply message and verifies the certificate serial number in the reply message. In some embodiments, the verification process may include determining whether a certificate serial number in the digital certificate held by the visitor B is consistent with the certificate serial number in the reply message.

In some embodiments, in response to a determination that the certificate serial number in the digital certificate held by the visitor B is inconsistent with the certificate serial number in the reply message, it is indicated that there may be a problem in the verification process, and the reply message is discarded.

In some embodiments, in response to a determination that the certificate serial number in the digital certificate held by the visitor B is consistent with the certificate serial number in the reply message, the certificate validity, the certificate validity time, and the visitor information of the digital certificate held by the visitor B are further determined.

In some embodiments, in response to the digital certificate held by the visitor B being valid, the timestamp in the reply message being within the certificate validity time, and the visitor information being consistent with the device information of the visitor B, the process proceeds to step 443. In response to the digital certificate held by the visitor B being invalid, the timestamp in the reply message being not within the certificate validity time, or the visitor information being inconsistent with the device information of the visitor B, the reply message is discarded.

In Step 443, the visitor B generates the message digest by performing the digest algorithm processing on all the contents of the reply message from the message header to the message digest based on the digest algorithm and compares the generated message digest with the message digest in the reply message.

In some embodiments, in response to the generated the message digest being consistent with the message digest in the reply message, representing the reply message being not tampered with, the process proceeds to step 444.

In some embodiments, in response to the generated message digest being inconsistent with the message digest in the reply message, it is indicated that the reply message is tampered with, and the reply message is discarded.

In Step 444, the visitor B generates a random number signature value by performing signing on the first quantum random number in the reply message based on a vehicle public key Pa and the signature encryption algorithm and compares the generated random number signature value with the random number signature value in the reply message.

In some embodiments, in response to the generated random number signature value being consistent with the random number signature value in the reply message, representing the reply message being sent by a holder (i.e., the vehicle A) of the vehicle private key Sa, the process proceeds to step 445.

In some embodiments, in response to the generated random number signature value being inconsistent with the random number signature value in the reply message, representing the reply message being not sent by the holder (i.e., vehicle A) of the vehicle private key Sa, the reply message is discarded.

In Step 445, the visitor B obtains the vehicle reply content by decrypting the encrypted vehicle reply content in the reply message based on the quantum key information in the digital certificate held by the visitor B, the quantum key, and the quantum encryption and decryption algorithm.

In some embodiments of the present disclosure, the visitor B may parse and verify the reply message, including verifying the message type, the certificate serial number, the integrity of the message, the validity of the signature, and the decryption of the content, so as to obtain the reply message of the vehicle A for subsequent processing.

In some embodiments of the present disclosure, the effectiveness of the vehicle encrypted communication method in the present disclosure is analyzed in the following four scenarios.

In Scenario 1, the hacker intercepts the message (the request message or the reply message) and wants to see the valid content of the message (the communication request content or the vehicle reply content).

After the hacker intercepts the message (the request message or the reply message), he may only see a plaintext portion of the message, and since the valid content of the message (the communication request content or the vehicle reply content) is encrypted by the quantum key for transmission, and the hacker does not have the quantum key, it is not possible to view the valid content of the message.

In Scenario 2 (Replay Attack), the hacker intercepts the message (the request message or the reply message) sent by a sender (the visitor B or the vehicle A), replays the message, and sends the replayed message to a receiver (the vehicle A or the visitor B).

In the vehicle encrypted communication method provided in some embodiments of the present disclosure, a defense against replay attacks is provided by embedding the quantum random number and the timestamp in the message. The quantum random numbers used by the communicating parties are generated in real time by a quantum random number generator, wherein the quantum random numbers are non-repeatable over a time period, and the communicating parties record the quantum random numbers in messages received during this time period. If a new message is received, the quantum random number in the new message is also new; if a replayed message is received, the quantum random number is present in the record. In addition, the freshness of the message may be ensured by the timestamp, and if the timestamp in the received message is out of the allowable range, the receiver may also decide that this message is invalid and discard it directly.

In Scenario 3, after the hacker intercepts the message (the request message or the reply message) sent by the sender (the visitor B or the vehicle A), the hacker sends the message back to the sender (the visitor B or the vehicle A).

In some embodiments of the present disclosure, when the receiver receives the message, either the visitor B or the vehicle A determines the message type, i.e., steps 421 and 441. If it is found that the message type is not the message type that it is supposed to receive, the message may be directly discarded without being processed.

In Scenario 4 (Impersonation Attack), the hacker intercepts the message (the request message or the reply message) sent by the sender (the visitor B or the vehicle A), changes the content of the message, and sends the changed message to the receiver (the vehicle A or the visitor B).

In some embodiments of the present disclosure, after receiving the message, the receiver parses the message according to the message format of the communication protocol. The receiver determines the message type to see if it should be sent to him/her, verifies the authenticity of the digital certificate through the serial number of the digital certificate in the message, generates a message digest by calculating all the contents from the message header to the message digest using the digest algorithm, determines whether the message contents are tampered with by comparing the generated message digest with the message digest in the received message, and the receiver determines a source of the message by verifying the quantum random number using the public key. Only after the verification of the above process, the valid contents of the message are obtained by decrypting using the quantum key.

If the hacker changes the content of the message header, the encrypted content, or the message digest, when the receiver verifies the message digest, the message digest generated after calculation may be inconsistent with the message digest in the received message, and the message may be discarded.

If the hacker changes the quantum random number or the random number signature value, the receiver may fail to verify the quantum random number, and the message may be still discarded.

As a result, a hacker may not inflict an effective attack on both communicating parties by changing the content of the message.

It should be noted that the description of the process 400 is provided merely for example and illustration, and is not intended to limit the scope of application of the present disclosure. For those skilled in the art, various modifications and changes may be made to the process 400 under the guidance of the present disclosure. However, these modifications and changes remain within the scope of the present disclosure.

Figure 5:
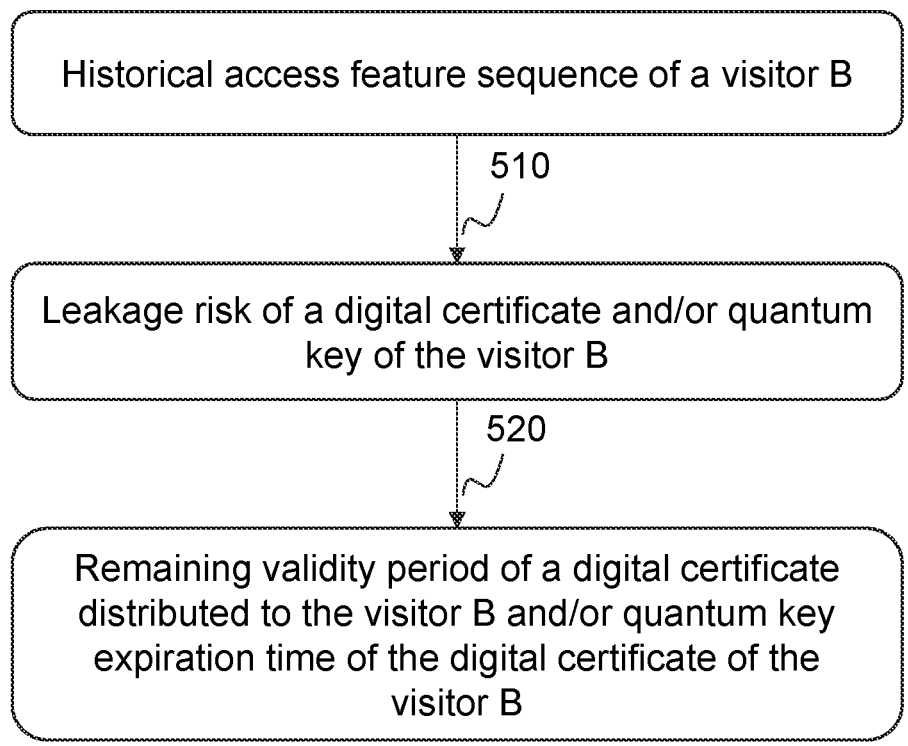
FIG. 5 is an exemplary flowchart of a process for adjusting a remaining validity period and/or a quantum key expiration time of a digital certificate according to some embodiments of the present disclosure.

FIG. 5 is an exemplary flowchart of a process for adjusting a remaining validity period and/or a quantum key expiration time of a digital certificate according to some embodiments of the present disclosure. In some embodiments, the process 500 may be performed by the system 100 for vehicle encrypted communication for vehicle-road-cloud collaboration.

In some embodiments, the certificate management module 150 may also be configured to dynamically adjust, based on a historical access feature sequence of a visitor B, the remaining validity period of the digital certificate distributed to the visitor B and/or the quantum key expiration time of the digital certificate of the visitor B.

The historical access feature sequence refers to a sequence composed of a plurality of historical access features. In some embodiments, the historical access feature sequence may be qualified by a time period, for example, the historical access feature sequence may be a sequence consisting of the historical access features within a last month.

The historical access feature refers to a feature related to the visitor B accessing a historical accessed subject. The historical access feature may include an access time, an access data type, an access data volume distribution, etc., of the visitor B accessing the accessed subject. The access between the visitor B and the historical accessed subject is mutual. The access may include the visitor B sending an access request to the historical accessed subject or receiving the access request from the historical accessed subject. The access time refers to a time when the access is actually sent. The access data type refers to a type of data obtained by the access request, including vehicle information, road environment information, etc. The access data volume distribution refers to data types and corresponding data volumes of multiple accesses of the visitor B.

In some embodiments, the vehicle information may include vehicle motion information, vehicle body temperature information, and vehicle maneuvering information. The vehicle maneuvering information may be manipulation of a steering wheel, an air conditioner, gears, etc. In some embodiments, the road environment information may include road slope information, road image information, road temperature and humidity information, etc.

More descriptions regarding the historical access feature may be found in the process 500 and its relevant descriptions.

The remaining validity period of the digital certificate refers to a remaining validity period of the digital certificate of the visitor B from a current time. The quantum key expiration time refers to a validity period of the quantum key. In some embodiments, when generating the digital certificate corresponding to the visitor, the certificate management module 150 may initially assign a digital certificate with a preset validity period to each visitor because the identity information of the visitor may not be determined at the beginning. The preset validity period may be one month, one year, two years, etc. The certificate management module 150 may subsequently dynamically adjust the remaining validity period or the quantum key expiration time of the digital certificate corresponding to the visitor based on gradually accumulated historical access features of the visitor.

The digital certificate transmitted by the visitor B includes the certificate serial number, and each certificate serial number uniquely corresponds to one visitor. Thus, the certificate management module 150 may adjust the remaining validity period or the quantum key expiration time of the digital certificate corresponding to the visitor B based on the historical access feature sequence of the visitor B.

In some embodiments, if a single visitor corresponds to a plurality of digital certificates, the certificate management module 150 may dynamically adjust the remaining validity periods or the quantum key expiration times of all the digital certificates corresponding to the visitor B based on the historical access feature sequence of the visitor B.

In some embodiments, the more elements the historical access feature sequence of the visitor contains (the larger the count of historical access features contained in the historical access feature sequence of the visitor), the more intensive the each historical access is, the more the access data types in each historical access feature are, and the larger the access data volume in each historical access feature is, the more frequent the visitor's access is, and the larger the risk is. As a result, the remaining validity period of the visitor's digital certificate and/or the quantum key expiration time of the visitor's digital certificate may be shortened. Whether the historical accesses are intensive may be determined based on the access time of each the historical access feature. A count of accessed data types in each the historical access feature and the access data volume in each historical access feature may be calculated as an average.

In some embodiments, the certificate management module may determine a specific adjustment value by querying a preset table. The preset table may be constructed through the access history experience, and information of the table includes correspondence between the specific adjustment value and the historical access feature sequence of the visitor. In some embodiments, the specific adjustment value may be negatively correlated with the historical access feature of the visitor. For example, the more the elements of the historical access feature are, the more intensive the each historical access is, etc., the larger the risk of the visitor is, and the remaining validity period and/or quantum key expiration of the visitor's digital certificate may be adjusted to make the remaining validity period and/or quantum key expiration time have smaller values.

More descriptions regarding adjusting the remaining validity period and/or the quantum key expiration time of the digital certificate may be found in the process 500.

In some embodiments of the present disclosure, the digital certificate with the preset validity period is initially assigned to each the visitor, and in combination with the gradually accumulated historical access feature of the visitor, the remaining validity period of the digital certificate may be dynamically adjusted to achieve adaptive security. For example, a leakage risk of the digital certificate or the quantum key of the visitor B is determined by the historical access features and a prediction model, and the remaining validity period or the quantum key expiration time of the digital certificate is dynamically adjusted according to the leakage risk of the digital certificate or the quantum key of the visitor B, which improves the accuracy of adjusting the remaining validity period or the quantum key expiration time of the digital certificate.

In some embodiments, the certificate management module 150 may dynamically adjust the remaining validity period and/or the quantum key expiration time of the digital certificate of the visitor B based on the leakage risk of the digital certificate and/or quantum key. As shown in FIG. 5, the process 500 specifically includes the operations.

In Step 510, the certificate management module 150 may determine, based on the historical access feature sequence of the visitor B, the leakage risk of the digital certificate and/or quantum key of the visitor B.

The leakage risk refers to a potential risk that sensitive information or confidential content of the digital certificate and/or quantum key may be obtained or exposed by an unauthorized person or system. In some embodiments, the certificate management module 150 may predict the leakage risk of the digital certificate and/or the quantum key through the prediction model. The prediction model may be a machine learning model, e.g., a neural network model (e.g., a convolutional neural network model), etc.

The prediction model is a model used to determine the leakage risk and/or the quantum key of the digital certificate. An input of the prediction model may be the historical access feature sequence of the visitor B, and an output of the prediction model may be the leakage risk and/or the quantum key of the digital certificate of the visitor B.

In some embodiments, a large number of first training samples with first labels may be input to an initial prediction model, and the initial prediction model may be trained based on a model training method such as a gradient descent method to obtain a trained prediction model.

In some embodiments, the first label includes an actual moment of leakage of the digital certificate and/or the quantum key of each visitor under a certain historical moment in the historical data. The first sample may include a historical feature sequence of the visitor that is reversed from the historical moment. The actual moment of the leakage may be a moment when it is discovered that there may be leakage of the key or an actual moment when an actual occurrence of the leakage.

The leakage risk may also be determined based on various ways. More descriptions may be found in FIG. 6 and its relevant descriptions.

In Step 520, the certificate management module 150 may dynamically adjust the remaining validity period and/or the quantum key expiration time of the digital certificate of the visitor B based on the leakage risk of the digital certificate or the quantum key of the visitor B.

In some embodiments, the remaining validity period of the digital certificate of the visitor B may be adjusted based on a leakage risk assessment result of the digital certificate of the visitor B. For example, if the risk is relatively large, it may be considered to shorten the remaining validity period of the digital certificate. The validity period of the digital certificate is shortened, which may reduce a time window when a hacker may attack using the certificate after the leakage.

In some embodiments, if the digital certificate of the visitor B includes the quantum key, it may be considered to adjust the quantum key expiration time based on the leakage risk assessment result. For example, if the risk is relatively large, the quantum key may be updated in advance, so that the expiration time is shorter, and a count of possible attacks that the hacker performs on the system during the time window after the leakage of the quantum key is reduced.

In some embodiments of the present disclosure, the leakage risk of the digital certificate or the quantum key is predicted through the prediction model, which helps to improve the accuracy of the prediction of the leakage risk.

In some embodiments, each of the historical access features in the historical access feature sequence may also include a credibility, and a communication frequency of the accessed subject accessed by the visitor B.

The credibility is a measure of the trustworthiness of a certain accessed subject. In some embodiments, the credibility of the accessed subject is negatively correlated with a count or frequency of times that access to the accessed subject is denied. That is, the greater the count/frequency of times that assess to the accessed subject is denied is, the smaller the credibility of the accessed subject is.

The communication frequency is a measure of the frequency of communication between a certain accessed subject and other subjects. In some embodiments, the certificate management module 150 may determine the communication frequency of the accessed subject based on a count of different subjects accessed by the accessed subject during a preset time period and a total count of times the accessed subject is accessed during the preset time period. As previously mentioned, the accesses are mutual, and the access may include the accessed subject sending the access requests to other subjects or receiving the access requests from other subjects. Thus, the other subjects may be subjects to which the accessed subject sends access or from which the accessed subject receives access. The total count of accesses also includes a count of sending and receiving accesses.

In some embodiments, the certificate management module 150 may determine the communication frequency by means of weighted summation based on the count of different subjects accessed by the accessed subject during the preset time period and a total count of times the accessed subject is accessed during the preset time period. The larger the count of different subjects accessed by the accessed subject during the preset time period, and the larger the total count of times the accessed subject is accessed during the preset time period, the greater the communication frequency.

In some embodiments, the communication frequency R may be determined based on the following equation (1).

$$R = k1*h + k2*d \tag{1}$$

where k1 and k2 denote weighting factors that may be set artificially based on experience. h denotes the count of different subjects accessed by the accessed subject during the preset time period, and d denotes the total count of the accessed subject is accessed during the preset time period.

In some embodiments of the present disclosure, if the visitor more frequently accesses other subjects with a relatively small credibility and a relatively high communication frequency, it indicates that the information leakage risk of the visitor is greater. The accuracy of adjusting the remaining validity period and/or the quantum key expiration time of the digital certificate of the visitor B may be improved through the credibility and the communication frequency of the accessed subject.

It should be noted that the description of the process 500 is merely provided for the purpose of example and illustration and is not intended to limit the scope of application of the present disclosure. For those skilled in the art, various modifications and changes may be made to the process 500 under the guidance of the present disclosure. However, these modifications and changes remain within the scope of the present disclosure.

Figure 6:
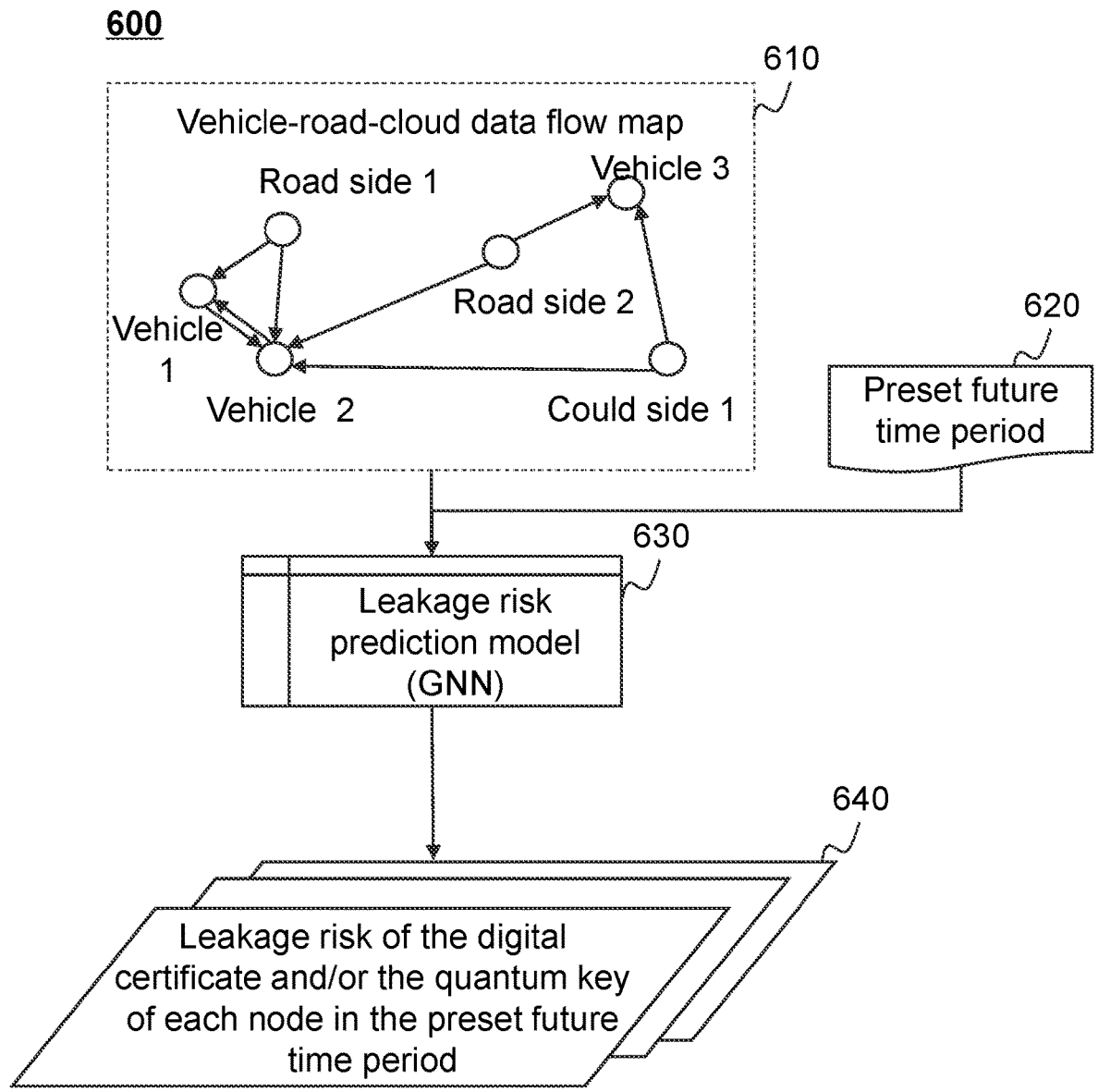
FIG. 6 is a schematic diagram of determining a leakage risk via a vehicle-road-cloud data flow map according to some embodiments of the present disclosure.

FIG. 6 is a schematic diagram of determining a leakage risk via a vehicle-road-cloud data flow map according to some embodiments of the present disclosure. In some embodiments, the certificate management module 150 may also determine the leakage risk of a digital certificate and/or a quantum key based on the vehicle-road-cloud data flow map 610, which is shown as follows.

The vehicle-road-cloud data flow map 610 refers to a schematic diagram that reflects vehicle-road-cloud data. In the construction process, the vehicle-road-cloud data flow map 610 may represent different types of nodes and communication relationships between the nodes as a graph structure. In some embodiments, as shown in FIG. 6, the vehicle-road-cloud data flow map 610 may include three types of nodes, i.e., a vehicle node, a road-side node, and a cloud-side node. Each node in the vehicle-road-cloud data flow map 610 may be used as a visitor or an accessed subject. Each node corresponds to a vehicle, a road-side device, and a cloud-side device, respectively, and each node has a corresponding node feature. In some embodiments, since the visitor B is also one of the vehicle, the road-side device, or the cloud-side device, the visitor B may also be embodied as a node in the vehicle-road-cloud data flow map 610.

The node feature of the vehicle node refers to a data generation distribution of vehicle data. The data generation distribution includes an amount of different types of data generated in a preset time period (e.g., within a last month), which is captured by sensors of a corresponding vehicle. The different types of data of the vehicle node may include vehicle motion information, vehicle body temperature information, and vehicle maneuvering information, etc. The vehicle maneuvering information may be maneuvering of a steering wheel, an air conditioner, gears, etc. For example, the data generation distribution of the vehicle node A may be represented as ((d1, 20), (d2, 15), ...), which indicates that the vehicle node A generates 20 GB of vehicle motion data d1, 15 GB of vehicle maneuvering data d2, and ... in the preset time period.

In some embodiments, the node feature of the vehicle node may be determined through access data in the historical access feature. The data of each type of vehicle node may correspond to the vehicle information in the historical access feature, and the data generation distribution of the vehicle nodes may be determined based on the vehicle information in the historical access feature.

The node feature of the road-side node refers to a data generation distribution of road-side data and/or a geographic location where the road-side node is located. The data generation distribution of the road-side node is an amount of data generated in a preset time period (e.g., the amount of road environment information generated of the road-side device corresponding to the road-side node), which is captured by a road side. The road environment information may include road slope information, road image information, road temperature and humidity information, etc. The geographic location where the road-side node is located is an actual geographic location of the road-side device, which may be represented by means of latitude and longitude, coordinates, etc. Since the road-side device is generally disposed in a fixed location, the data generation distribution of the road-side data may be road environment information of the fixed location.

In some embodiments, the node feature of the road-side node may also be determined through access data in the historical access feature. The data captured by the road-side may correspond to the road environment information in the historical access feature, and the data generation distribution of the road-side data may be determined based on the road environment information in the historical access feature. The geographic location where the road-side node is located may be determined through built-in device information of the road-side device.

The node feature of the cloud-side node refers to a data access frequency of the cloud side. The data access frequency refers to a frequency at which the cloud is accessed by other clients. In some embodiments, the node feature of the cloud-side node may be determined by an access data volume distribution in the historical access feature. For example, the data access frequency may be determined by selecting accesses related to a cloud side from the access data volume distribution.

As shown in FIG. 6, the nodes that may communicate in the vehicle-road-cloud data flow map 610 may be connected by an edge. The edge is a directed edge, e.g., an edge from a vehicle 1 to a vehicle 2 indicates that the vehicle 1 sends an access request to the vehicle 2. A feature of the edge refers to an access feature sequence in a preset time period. For example, the feature of the edge from the vehicle 1 to the vehicle 2 represents the access feature sequence composed of historical accesses of the vehicle 1 to the vehicle 2, which may be obtained by extracting from the historical access feature sequence of the vehicle 1.

In some embodiments, the certificate management module 150 may construct the vehicle-road-cloud data flow map 610 based on at least the historical access feature sequence of the visitor B. In some embodiments, the certificate management module 150 may construct the vehicle-road-cloud data flow map 610 based on the historical access feature sequence and other relevant information of the visitor B. For example, the certificate management module 150 may also construct the vehicle-road-cloud data flow map 610 based on the historical access feature sequence of other visitors (e.g., vehicle 1, vehicle 2, road side 1, road side 2, cloud side 1, etc., all of which may be used as visitors or accessed subjects).

In some embodiments, the node feature of the vehicle node and the node feature of the road-side node may also include a credibility and a communication frequency. More descriptions regarding the credibility and the communication frequency may be found in FIG. 5 and the related descriptions.

In some embodiments of the present disclosure, the security, reliability, timeliness, and collaboration of the vehicle nodes and the road-side nodes in the Internet of Vehicles or other communication networks may be improved through the credibility and the communication frequency in the node feature, thereby improving system efficiency and better user experience.

In some embodiments, the certificate management module 150 may predict the leakage risk of the digital certificate and/or the quantum key of the visitor B based on the vehicle-road-cloud data flow map 610 through a leakage risk prediction model 630.

The leakage risk prediction model 630 refers to a model that predicts the leakage risk of the digital certificate and/or the quantum key based on the vehicle-road-cloud data flow map 610. The leakage risk prediction model 630 may be a machine learning model, such as a neural network model (e.g., a Graph Neural Networks (GNN) model), etc.

In some embodiments, an input of the leakage risk prediction model 630 may include the vehicle-road-cloud data flow map 610 and a preset future time period 620, and an output of the leakage risk prediction model 630 is the leakage risk 640 of the digital certificate and/or the quantum key output based on each node of the vehicle-road-cloud data flow map 610 in the preset future time period.

The preset future time period 620 is a specific period of time in a set future time and is used to predict or set a future event or situation. The future time period may be set to assess the leakage risk of the digital certificate and/or the quantum key, which may make the prediction more definitive. For example, a length of the preset future time period may be hours, days, weeks, or a longer time period, which depends on specific needs.

The leakage risk 640 of the digital certificate and/or the quantum key of each node in the preset future time period is output by the leakage risk prediction model 630, which may be used to dynamically adjust the remaining validity period and/or the quantum key expiration time of the digital certificate of the visitor B in the operation 520. For example, if the output result is that the node corresponding to the visitor B has a relatively high leakage risk in the preset future time period, the certificate management module 150 may appropriately shorten the remaining validity period or the quantum key expiration time of the digital certificate of the visitor B.

In some embodiments, a trained leakage risk prediction model may be obtained by inputting a large number of second training samples with the second labels to an initial leakage risk prediction model. In some embodiments, the second label may be whether the digital certificate and/or the quantum key of the subject corresponding to each node at a certain historical moment in historical data is leaked, and the first training sample may be a historical access feature sequence of the visitor that is reversed from the historical moment. For example, if the leakage risk occurs at a certain historical moment, a first label value is set to 1, otherwise, the first label value is set to 0.

In some embodiments of the present disclosure, by jointly examining the information from different vehicles, road sides, and cloud sides, the leakage risk of each side may be predicted comprehensively based on the leakage risk prediction model (e.g., a GNN model), which further improves the accuracy of the prediction.

In some embodiments, the node feature of the vehicle node and the node feature of the road-side node in the vehicle-road-cloud data flow map may also include a frequency of receiving a fake digital certificate during a historical time period.

The frequency of receiving the fake digital certificate in the historical time period refers to a count or frequency of the fake digital certificates encountered by the vehicle nodes and the road-side nodes in the vehicle-road-cloud data flow map in the historical time period.

In some embodiments, the vehicle node and the road-side node may receive the digital certificates from other nodes for purposes such as verifying identities or ensuring communication security. In some embodiments, however, a malicious attacker may forge the digital certificate in an attempt to impersonate a legitimate node, thereby undermining the security of the system.

In some embodiments of the present disclosure, if a certain node receives the fake digital certificates frequently, it is considered that the node suffers from attacks frequently, i.e., the node may have a higher probability of information leakage. The accuracy of the determined leakage risk may be further improved by considering the frequency of receiving the fake digital certificates in the historical time period.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

In addition, those skilled in the art will understand that various aspects of the present disclosure may be illustrated and described in several patentable categories or situations, including any new and useful process, machine, product, or combination of substances, or any new and useful improvements thereto. Accordingly, all aspects of the present disclosure may be performed entirely by hardware, may be performed entirely by software (including firmware, resident software, microcode, etc.), or may be performed by a combination of hardware and software. The above hardware or software can be referred to as "data block," "module," "engine," "unit," "component," or "system." In addition, aspects of the present disclosure may be presented as a computer product located in one or more computer-readable mediums, the product including computer-readable program code.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for vehicle encrypted communication for vehicle-road-cloud collaboration, comprising:
 a vehicle-side communication unit disposed on a vehicle A and a second quantum random number generator (170) disposed on a visitor B, wherein the visitor B is a communication device in a vehicle-road-cloud collaboration system, including other vehicles, cloud sides, and road sides;

the second quantum random number generator (170) is configured to generate a second quantum random number;

the vehicle-side communication unit includes: a first quantum random number generator (110), a quantum key management module (120), an on-vehicle communication module (130), a user authorization module (140), a certificate management module (150), and a quantum encryption and decryption module (160), wherein the quantum key management module (120) is connected to the first quantum random number generator (110) through a fiber channel;

wherein the system further comprises:
a non-transitory computer-readable storage medium storing executable instructions for vehicle encrypted communication for vehicle-road-cloud collaboration; and
at least one processor in communication with the non-transitory computer-readable storage medium, when executing the executable instructions, the at least one processor is directed to cause the system to:
generate a first quantum random number;
obtain the first quantum random number as a quantum key, and update and manage the quantum key;
receive an access request from the visitor B and send a digital certificate to the visitor B;
decide, by a user of the vehicle A, whether to authorize the access request of the visitor B through the user authorization module (140);
generate the digital certificate corresponding to the access request based on the access request of the visitor B, and store and manage the digital certificate, wherein the digital certificate is used to establish a communication connection between the visitor B and the on-vehicle-communication module (130); and
encrypt and decrypt a communication content based on the quantum key in the digital certificate;
wherein the visitor B generates the access request and sends the access request to the vehicle A, after receiving the access request from the visitor B, the user checks the access request and decides whether to authorize the access request through the user authorization module (140), and in response to the access request of the visitor B being authorized, the at least one processor is directed to cause the system to generate the digital certificate corresponding to the access request, and send the digital certificate to the visitor B;
the communication connection is established between the visitor B and the on-vehicle communication module (130) through the digital certificate, the first quantum random number, and the second quantum random number;
the digital certificate includes a certificate serial number, certificate validity, a certificate validity time, visitor information, quantum key information, and a signature algorithm, wherein
the certificate serial number is a unique identification number of the digital certificate;
the certificate validity time is generated based on an access time of the visitor B determined by the user;
the certificate validity is determined based on the certificate validity time, wherein the certificate validity is valid when the access time is within the certificate validity time, and the certificate validity is invalid when the access time is outside the validity time;
the visitor information is device information of the visitor B;
the quantum key information includes the quantum key, a quantum encryption and decryption algorithm, and a quantum key expiration time; and
the signature algorithm includes a digest algorithm and a signature encryption algorithm, the digest algorithm being configured to generate a digest, and the signature encryption algorithm being configured to perform signing to generate a signature value; and
the communication connection being established between the visitor B and the on-vehicle communication module (130) of the vehicle A through the digital certificate, the first quantum random number and the second quantum random number includes:
step 410, converting, by the visitor B, a communication request content into a request message according to a message format of a communication protocol based on the certificate serial number and the quantum key information of the digital certificate held by the visitor B, and the second quantum random number generated in real time by the second quantum random number generator (170) and sending the request message to the vehicle A;
step 420, obtaining, by the at least one processor, the communication request content by parsing the request message according to the message format of the communication protocol after receiving the request message sent by the visitor B;
step 430, generating, by the vehicle A, a vehicle reply content by obtaining vehicle data based on the communication request content, converting the vehicle reply content into a reply message according to the message format of the communication protocol based on the certificate serial number and the quantum key information in a corresponding digital certificate managed by the certificate management module (150) and the first quantum random number generated in real time by the first quantum random number generator (110), and sending the reply message to the visitor B; and
step 440, obtaining, by the visitor B, the vehicle reply content by parsing the reply message according to the message format of the communication protocol after receiving the reply message sent by the vehicle A, wherein
in step 410 and step 430, a structure of the request message or the reply message includes in turn: a start identifier, a message header, a message body, and an end identifier;
a content in the message header includes in turn: a message type, a message length, the certificate serial number, a timestamp, and a message serial number, wherein the message type includes a type of the request message sent by the visitor B to the vehicle A and a type of the reply message sent by the vehicle A to the visitor B; and the timestamp is a timestamp at which the request message or the reply message is generated; and
a content in the message body includes in turn: an encrypted communication request content or an encrypted vehicle reply content, a message digest, the second quantum random number or the first quantum random number, and a random number signature value, wherein the encrypted communication request content or the encrypted vehicle reply content is obtained by encrypting the communication request content or the vehicle reply content based on the quantum encryption and decryption algorithm and the quantum key in the quantum key information; the message digest is obtained by performing the digest algorithm processing on all contents from the message header to the message digest; the second quantum random number and the first quantum random number are generated in real time by the second quantum random number generator (170) and the first quantum random number generator (110), respectively; and the random number signature value is generated by the visitor B performing signing on the second quantum random number based on a visitor private key Sb and the signature encryption algorithm, or is generated by the vehicle A performing signing on the first quantum random number based on a vehicle private key Sa and the signature encryption algorithm.

2. The system of claim 1, wherein in response to expiration of a quantum key in a certain digital certificate managed by the certificate management module (150), the at least one processor is directed to cause the system to update the quantum key of the certain digital certificate, and after the digital certificate managed by the certificate management module (150) is updated, resend the updated digital certificate to the visitor B.

3. The system of claim 1, wherein in step 420, parsing, by the at least one processor, the request message includes:
step 421, determining, by the at least one processor, whether the message type in the request message is the type of the request message sent by the visitor B to the vehicle A, in response to the message type in the request message being the type of the request message sent by the visitor B to the vehicle A, proceeding to step 422, or in response to the message type in the request message being not the type of the request message sent by the visitor B to the vehicle A, discarding the request message and failing to establish the communication connection between the vehicle A and the visitor B;
step 422, reading, by the at least one processor, the certificate serial number in the request message and verifying the certificate serial number in the request message, including: determining whether the certificate management module (150) includes and manages a digital certificate corresponding to a certificate serial number that is consistent with the certificate serial number in the request message by retrieving the managed digital certificate,
in response to a determination that the certificate management module (150) does not include the digital certificate corresponding to the certificate serial number that is consistent with the certificate serial number in the request message, representing the digital certificate held by the visitor B as being a fake certificate, discarding the request message and failing to establish the communication connection between the vehicle A and the visitor B; or
in response to a determination that the certificate management module (150) includes the digital certificate corresponding to the certificate serial number that is consistent with the certificate serial number in the request message, representing the digital certificate held by the visitor B as being an authentic certificate, determining, by the at least one processor, the certificate validity, the certificate validity time, and the visitor information of the corresponding digital certificate-managed by the certificate management module (150), in response to the corresponding digital certificate being valid, the timestamp in the request message being within the certificate validity time, and the visitor information being consistent with the device information of the visitor B, proceeding to step 423, or in response to the digital certificate being invalid, the timestamp in the request message being not within the certificate validity time, or the visitor information being inconsistent with the device information of the visitor B, discarding the request message and failing to establish the communication connection between the vehicle A and the visitor B;
step 423, generating, by the at least one processor, the message digest by performing the digest algorithm processing on all the contents of the request message from the message header to the message digest based on the digest algorithm and comparing the generated message digest with the message digest in the request message,
in response to the generated message digest being consistent with the message digest in the request message, representing the request message as being not tampered with, proceeding to step 424; or
in response to the generated message digest being inconsistent with the message digest in the request message, representing the request message as being tampered with, discarding the request message and failing to establish the communication connection between the vehicle A and the visitor B;
step 424, generating, by the at least one processor, a random number signature value by performing signing on the second quantum random number in the request message based on a visitor public key Pb and the signature encryption algorithm and comparing the generated random number signature value with the random number signature value in the request message,
in response to the generated random number signature value being consistent with the random number signature value in the request message, representing the request message as being sent by the visitor B, proceeding to step 425; or
in response to the generated random number signature value being inconsistent with the random number signature value in the request message, representing the request message as being not sent by the visitor, discarding the request message and failing to establish the communication connection between the vehicle A and the visitor B; and
step 425, receiving, by the at least one processor, the encrypted communication request content through the on-vehicle communication module (130), obtaining the communication request content by decrypting the encrypted communication request content using the quantum encryption and decryption module (160) based on the quantum key information in the corresponding digital certificate managed by the certificate management module (150), the quantum key, and the quantum encryption and decryption algorithm.

4. The system of claim 1, wherein in step 440, parsing, by the visitor B, the reply message includes:
step 441, determining, by the visitor B, whether a message type in the reply message is the type of the reply message sent by the vehicle A to the visitor B based on the message type in the reply message, in response to the message type in the reply message being the type of the reply message sent by the vehicle A to the visitor B, proceeding to step 442, or in response to the message type in the reply message being not the type of the reply message sent by the vehicle A to the visitor B, discarding the reply message;

step 442, reading, by the visitor B, the certificate serial number in the reply message and verifying the certificate serial number in the reply message, including: determining whether a certificate serial number in the digital certificate held by the visitor B is consistent with the certificate serial number in the reply message,
- in response to a determination that the certificate serial number in the digital certificate held by the visitor B is inconsistent with the certificate serial number in the reply message, discarding the reply message; or
- in response to a determination that the certificate serial number in the digital certificate held by the visitor B is consistent with the certificate serial number in the reply message, determining the certificate validity, the certificate validity time, and the visitor information of the digital certificate held by the visitor B, in response to the digital certificate held by the visitor B being valid, the timestamp in the reply message being within the certificate validity time, and the visitor information being consistent with the device information of the visitor B, proceeding to step 443, or in response to the digital certificate held by the visitor B being invalid, the timestamp in the reply message being not within the certificate validity time, and the visitor information being inconsistent with the device information of the visitor B, discarding the reply message;

step 443, generating, by the visitor B, the message digest by performing the digest algorithm processing on all the contents of the reply message from the message header to the message digest based on the digest algorithm and comparing the generated message digest with the message digest in the reply message,
- in response to the generated message digest being consistent with the message digest in the reply message, representing the reply message as being tampered with, proceeding to step 444; or
- in response to the generated message digest being inconsistent with the message digest in the reply message and the reply message being tampered with, discarding the reply message;

step 444, generating, by the visitor B, a random number signature value by performing signing on the first quantum random number in the reply message based on a vehicle public key Pa and the signature encryption algorithm and comparing the generated random number signature value with the random number signature value in the reply message,
- in response to the generated random number signature value being consistent with the random number signature value in the reply message, representing the reply message as being sent by the visitor A, proceeding to step 445; or
- in response to the generated random number signature value being inconsistent with the random number signature value in the reply message, representing the reply message as being not sent by the visitor A, discarding the reply message; and step 445, obtaining, by the visitor B, the vehicle reply content by decrypting the encrypted vehicle reply content in the reply message based on the quantum key information in the digital certificate held by the visitor B, the quantum key, and the quantum encryption and decryption algorithm.

5. The system of claim 1, wherein when generating the access request, the visitor B also generates a visitor public key Pb and a visitor private key Sb corresponding to the visitor B, and when sending the access request to the vehicle A, the visitor B also sends the visitor public key Pb to the vehicle A; and
- when generating, based on the access request of the visitor B, the digital certificate corresponding to the access request, the at least one processor is further directed to cause the system to generate a vehicle public key Pa and a vehicle private key Sa corresponding to the access request, and when sending the digital certificate to the visitor B, the at least one processor is further directed to cause the system to send the vehicle public key Pa to the visitor B.

6. A method for vehicle encrypted communication for vehicle-road-cloud collaboration, applied to a system for vehicle-encrypted communication for vehicle-road-cloud collaboration wherein the method is executed by at least one processor of the system, the system further comprising:
- a vehicle-side communication unit disposed on a vehicle A and a second quantum random number generator (170) disposed on a visitor B, wherein the visitor B is a communication device in a vehicle-road-cloud collaboration system, including other vehicles, cloud sides, and road sides; the second quantum random number generator (170) is configured to generate a second quantum random number;
- wherein the at least one processor is directed to cause the system to:
- generate a first quantum random number;
- connect to the first quantum random number generator (110) through a fiber channel and is configured to obtain the first quantum random number as a quantum key, and update and manage the quantum key;
- receive an access request from the visitor B and send a digital certificate to the visitor B;
- decide, by a user of the vehicle A, whether to authorize the access request of the visitor B;
- generate the digital certificate corresponding to the access request based on the access request of the visitor B, and store and manage the digital certificate, wherein the digital certificate is used to establish a communication connection between the visitor B and the on-vehicle-communication module (130); and
- encrypt and decrypt a communication content based on the quantum key in the digital certificate;

the method including:

step 310, generating, by the visitor B, the access request, a visitor public key Pb and a visitor private key Sb corresponding to the visitor B and sending, by the visitor B, the access request together with the visitor public key Pb to the vehicle A; step 320, checking, by a user of the vehicle A, the access request and deciding whether to authorize the access request of the visitor B through the user authorization module (140) after receiving the access request and the visitor public key Pb;

step 330, generating the digital certificate, a vehicle public key Pa and a vehicle private key Sa corresponding to the vehicle A after the user authorizes the access request of the visitor B and determines the access time of the visitor B;

step 340, generating a certificate digest of the digital certificate based on a digest algorithm, generating a first signature value x1 of the digital certificate by performing signing on the certificate digest based on the vehicle private key Sa and a signature encryption algorithm in the digital certificate, obtaining an encrypted digital certificate by encrypting the digital certificate accompanied with the first signature value x1 and the vehicle public key Pa based on the visitor public key Pb, and sending the encrypted digital certificate to the visitor B; storing the digital certificate at the same time; and step 350, obtaining, by the visitor B, the digital certificate, the accompanying first signature value x1, and the vehicle public key Pa by decrypting the encrypted digital certificate based on the visitor private key Sa after receiving the encrypted digital certificate, generating, by the visitor B, a certificate digest of the digital certificate based on the digest algorithm, generating, by the visitor B, a second signature value x2 of the digital certificate by performing signing on the certificate digest based on the vehicle public key Pa and the signature encryption algorithm in the digital certificate, and comparing, by the visitor B, the generated second signature value x2 with the accompanying first signature value x1, in response to the generated second signature value x2 being consistent with the accompanying first signature value x1 and the digital certificate being authentic, storing, by the visitor B, the digital certificate locally; and in response to the generated second signature value x2 being inconsistent with the accompanying first signature value x1 and the digital certificate being fake, discarding, by the visitor B, the digital certificate.

\* \* \* \* \*